(12) United States Patent
Jeon et al.

(10) Patent No.: US 10,343,888 B2
(45) Date of Patent: Jul. 9, 2019

(54) WATER PURIFIER

(71) Applicant: LG ELECTRONICS INC., Seoul (KR)

(72) Inventors: Jewook Jeon, Seoul (KR); Jungmin Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/863,539

(22) Filed: Jan. 5, 2018

(65) Prior Publication Data

US 2018/0194608 A1 Jul. 12, 2018

(30) Foreign Application Priority Data

Jan. 11, 2017 (KR) .................. 10-2017-0004019

(51) Int. Cl.
*B67D 1/14* (2006.01)
*B67D 1/00* (2006.01)
(Continued)

(52) U.S. Cl.
CPC ........ *B67D 1/1405* (2013.01); *A47J 31/4482* (2013.01); *B67D 1/0014* (2013.01); *B67D 1/0888* (2013.01); *B67D 1/0894* (2013.01); *B67D 2210/0001* (2013.01); *B67D 2210/00031* (2013.01); *C02F 1/003* (2013.01); *C02F 2307/10* (2013.01)

(58) Field of Classification Search
CPC .. B67D 1/1405; B67D 1/0014; B67D 1/0894; B67D 1/0888; B67D 2210/00031; B67D 2210/0001; C02F 1/003; C02F 2307/10; A47J 31/4482

USPC ......... 222/173, 612, 189.06–189.08, 189.11, 222/146.1–146.6, 320, 71
See application file for complete search history.

(56) References Cited

U.S. PATENT DOCUMENTS 8,047,125 B2 * 11/2011 Bazin .................. A47J 31/4489
99/293
2010/0107891 A1 * 5/2010 Vanderstegen-Drake .................. A47J 31/4485
99/323.1
(Continued)

FOREIGN PATENT DOCUMENTS

JP 2008-168237 7/2008
KR 20-0311226 4/2003
(Continued)

OTHER PUBLICATIONS

Korean Office Action dated Jul. 31, 2017 issued in Application No. 10-2017-0004019.
(Continued)

*Primary Examiner* — Lien M Ngo
(74) *Attorney, Agent, or Firm* — KED & Associates, LLP

(57) ABSTRACT

Provided is a water purifier. The water purifier includes a water purifier body including a housing defining an outer appearance and a filter provided in the housing to filter raw water introduced from the outside, a water discharge module including a water discharge nozzle that protrudes forward from the water purifier body to supply the water passing through the filter to the outside of the water purifier body, and a tray disposed below the water discharge nozzle. The water discharge module is provided to be elevatable.

22 Claims, 19 Drawing Sheets

(51) Int. Cl.
*B67D 1/08* (2006.01)
*A47J 31/44* (2006.01)
*C02F 1/00* (2006.01)

(56) References Cited

U.S. PATENT DOCUMENTS

| | | | |
|---|---|---|---|
| 2015/0232320 A1* | 8/2015 | Wait | F25D 31/005 |
| | | | 165/200 |
| 2017/0321931 A1* | 11/2017 | Choi | B67D 1/0004 |
| 2018/0058749 A1* | 3/2018 | Lee | B67D 1/1234 |

FOREIGN PATENT DOCUMENTS

| | | |
|---|---|---|
| KR | 10-2003-0067997 | 8/2003 |
| KR | 10-2010-0054580 | 5/2010 |
| KR | 10-1338670 | 12/2013 |
| KR | 10-1381803 | 4/2014 |

OTHER PUBLICATIONS

Korean Office Action dated Aug. 14, 2018 issued in Application No. 10-2018-0060558.
Korean Office Action dated Feb. 1, 2019 issued in Application No. 10-2018-0060559.

\* cited by examiner

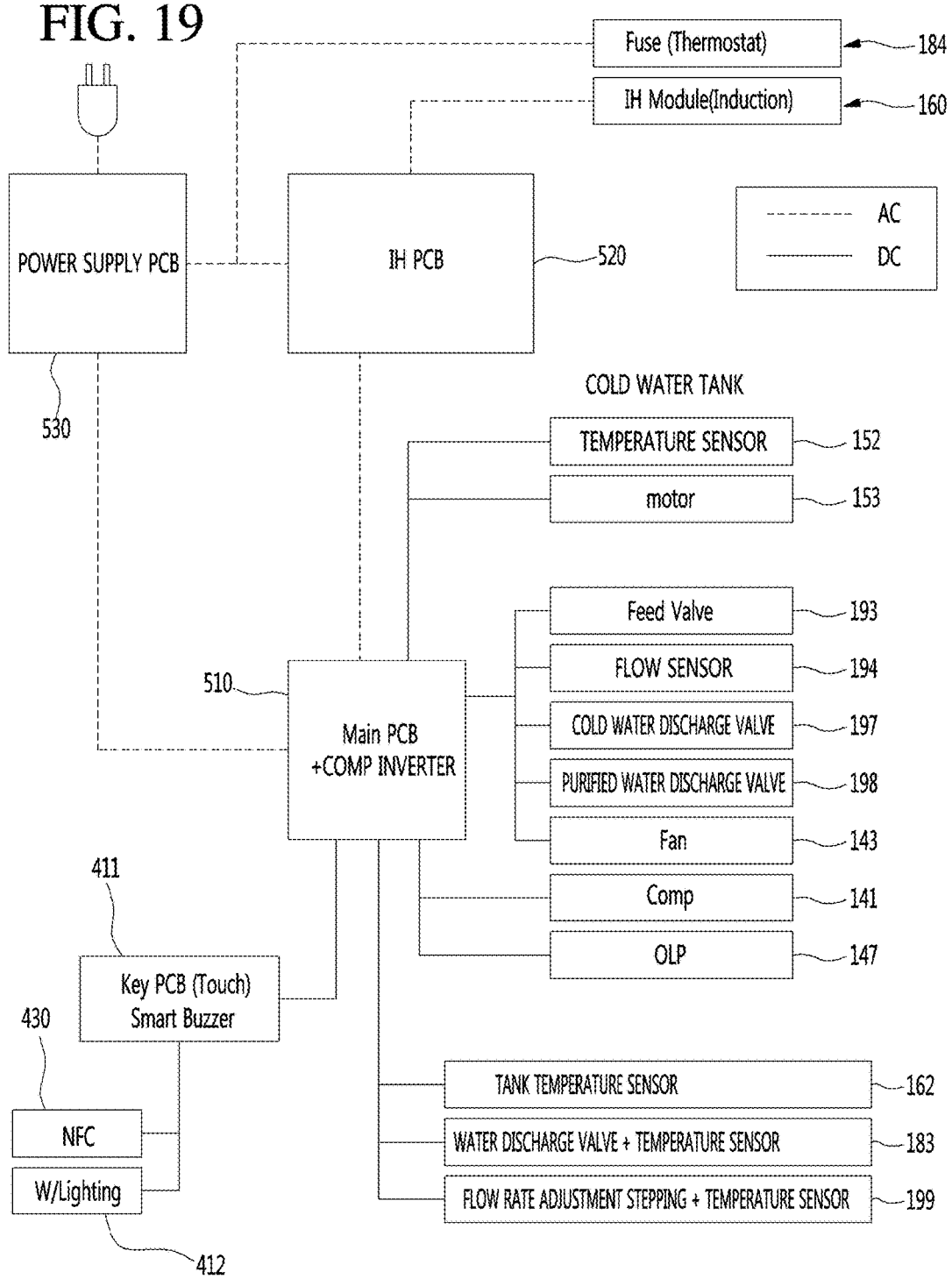

WATER PURIFIER

CROSS-REFERENCE TO RELATED APPLICATION(S)

The present application claims priority under 35 U.S.C. 119 and 35 U.S.C. 365 to Korean Patent Application No. 10-2017-0004019, filed in Korea on Jan. 11, 2017, which is hereby incorporated by reference in its entirety.

BACKGROUND

1. Field

The present disclosure relates to a water purifier.

2. Background

In general, water purifiers are being used for household purposes as mechanisms that filter water to remove impurities. Generally, water purifiers are connected to a water supply system to remove floating matters or harmful components, which are contained in tap water and purify as much water as desired by user's manipulation to dispense the purified water.

Water purifiers are being released in various products, which are capable of dispensing hot water and cold water as well as purified water. In recent years, water purifiers capable of being installed in various installation environments with small sizes are being developed.

As illustrated in FIG. 1, a water purifier 1 includes a cabinet 2 defining an outer appearance thereof and a dispenser 3. Here, the dispenser 3 means a space in which a user receives drinking water. Thus, the dispenser 3 may be generally defined in a front portion of the cabinet 2.

A cock 4 through which drinking water is discharged is provided in the dispenser 3, and a tray 5 on which a water glass is placed is disposed below the cock 4. In this state, when a user manipulates a lever or a button 6, stored water may be dispensed through the cock 4. That is, while the user manipulates the lever or the button 6, a valve of the cock 4 is opened to dispense water. Here, the user terminates the manipulation of the lever or the button 6 while confirming an amount of water filled into a cup or a container. The water purifier according to the related art is in a fixed state so that a water discharge port, i.e., the cock 4 is maintained at a constant height.

However, in the water purifier according to the related art, when the water glass is placed on the tray to dispense water, a portion of the dispensed water collides with the water glass while the water drops into the water glass and thus is splashed out of the water glass due to a difference in height between the water discharge port and the water glass. Particularly, in case of a water glass having a short length, a greater amount of water may be splashed out of the water glass.

BRIEF DESCRIPTION OF THE DRAWINGS

Embodiments will be described in detail with reference to the following drawings in which like reference numerals refer to like elements, and wherein:

FIG. 19 is a block diagram illustrating a flow of a control signal in the water purifier.

DETAILED DESCRIPTION

Figure 1:
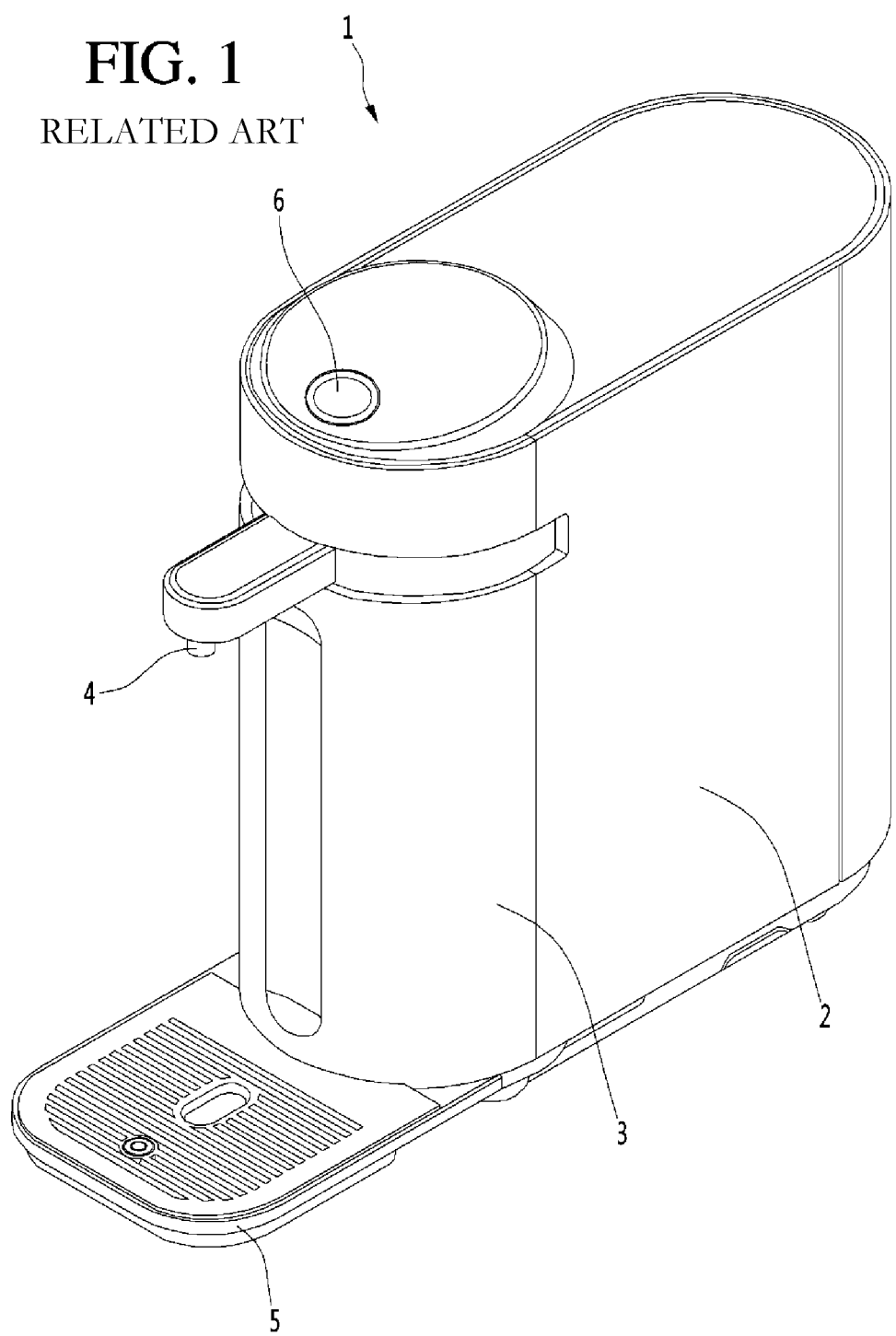
FIG. 1 is a perspective view illustrating an example of a water purifier according to a related art.
Figure 2:
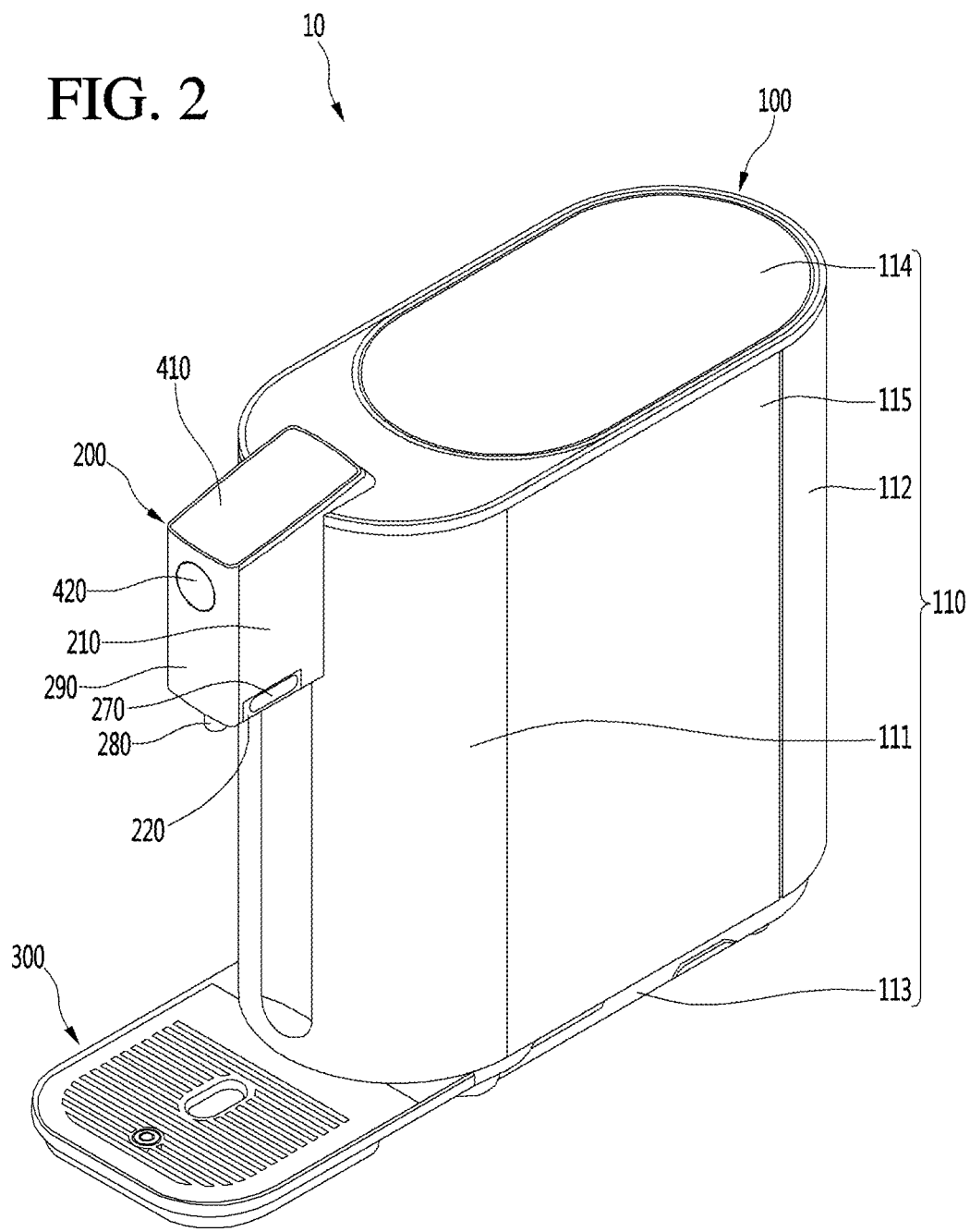
FIG. 2 is a perspective view of a water purifier according to an embodiment.
Figure 3:
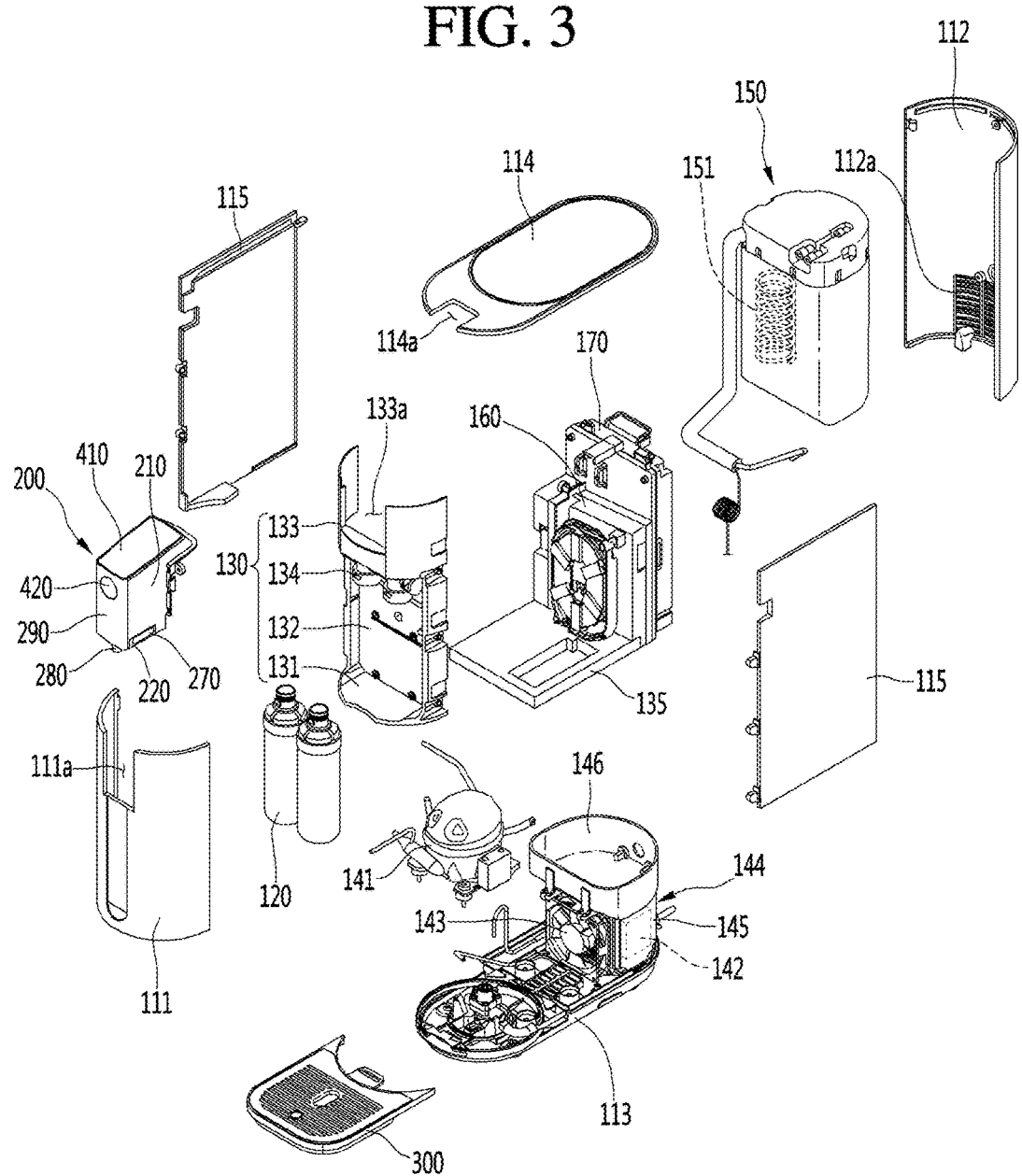
FIG. 3 is an exploded perspective view of the water purifier.

Referring to FIGS. 2 and 3, a water purifier 10 according to an embodiment may include a water purifier body 100 including a housing 110 defining an outer appearance and a filter 120 provided in the housing 110 to filter raw water introduced from the outside, a water discharge module 200 including a water discharge nozzle 280 that protrudes forward from the water purifier body 100 to supply the water passing through the filter 120 to the outside of the water purifier body 100, and a tray 300 disposed below the water discharge nozzle 280.

The outer appearance of the water purifier body 100 may be defined by the housing 110. The housing 110 includes a front cover 111 defining an outer appearance of a front surface, a rear cover 112 defining an outer appearance of a rear surface, a base 113 defining a bottom surface, a top cover 114 defining a top surface, and side panels 115 defining both left and right surfaces. The front cover 111, the rear cover 112, the base 113, the top cover 114, and the pair of side panels 115 may be assembled with each other to constitute the housing 110 defining the outer appearance of the water purifier body 100.

Here, each of front and rear ends of the base 113 and the top cover 114 may be rounded. Each of the front cover 111 and the rear cover 112 may protrude forward and backward to have a curvature corresponding to each of the front and rear ends of the base 113 and the top cover 114, which are rounded.

Also, the water discharge module 200 is disposed on the front surface of the water purifier body 100. The water discharge module 200 may protrude forward from the front cover 111 to dispense purified water through the water discharge nozzle 280 that protrudes downward.

For this, mounting grooves 111a and 114a may be defined in the front cover 111 and the top cover 114 so the water discharge module 200 is inserted and fixed.

In detail, the mounting groove 111a may have a shape that is recessed downward from a central upper end of the front cover 111, and the mounting groove 114a may have a shape that is recessed backward from a front end of the top cover 114.

The water discharge module 200 will be described below in more detail.

A filter 120 for purifying water and a filter bracket 130 on which a plurality of valves (not shown) are mounted may be provided in the housing 110.

The filter bracket 130 may include a bottom part 131 coupled to the base 113, a filter accommodation part 132 in which the filter 120 is accommodated, and a water discharge module mounting part 133 on which the water discharge module 200 is mounted.

In detail, the bottom part 131 may have a shape corresponding to that of the front end of the base 113 and be coupled to the base 113. The bottom part 131 may be coupled to fix a mounted position of the filter bracket 130 and define a shape of a bottom surface of the filter accommodation part 132.

The filter bracket 130 may be hooked to the base in a hook manner. Alternatively, the filter bracket 130 may be fixed by using a screw that is coupled to the bottom surface of the base 113.

The filter accommodation part 132 may extend in a vertical direction and define a space that is recessed backward (a right side in the drawing) from a front side (a left side in the drawing) to accommodate the filter 120. A plurality of filters 120 may be mounted on the filter accommodation part 132. The filter 120 may purify supplied raw water (tap water) and be constituted by combination of filters having various functions.

Also, a filter socket 134 on which the filter 120 is mounted may be further provided in the filter accommodation part 132. A tube through which the purified water flows may be provided in the filter socket 134 and connected to a plurality of valves (not shown). Thus, the raw water may sequentially pass through the filters 120 to flow to the valve (not shown) for supplying water.

The plurality of valves (not shown) may be provided in a rear surface (a right side in the drawing) of the filter accommodation part 132. The valves (not shown) may selectively supply purified water, cold water, and hot water to the filter 120, a cooling tank 150, an induction heating assembly 160, and the water discharge module 200.

The water discharge module mounting part 133 is disposed on an upper end of the filter accommodation part 132. The water discharge module mounting part 133 has a structure in which a mounting groove 133a is defined downward from an upper side in an upper end of the water discharge module mounting part 133 so that the water discharge module 200 is inserted and fixed. Here, the water discharge module mounting part 133 may have a curvature corresponding to that of the front cover 111 that covers a front side of the water discharge module mounting part 133. An upper portion of the filter bracket 130 may be covered by the top cover 114.

A compressor 141 and a condenser 142 are provided on the top surface of the base 113. Also, a cooling fan 143 is disposed between the compressor 141 and the condenser 142 to cool the compressor 141 and the condenser 142. An inverter-type compressor capable of adjusting cooling capacity by varying a frequency may be used as the compressor 141. Thus, the purified water may be efficiently cooled to reduce power consumption.

Also, the condenser 142 may be disposed at a rear side of the base 113 and also disposed at a position corresponding to a discharge hole 112a defined in the rear cover 112. The condenser 142 may have a structure in which a flat tube-type refrigerant tube is bent several times to efficiently use a space and improve heat-exchange efficiency and be accommodated in a condenser bracket 144.

A condenser mounting part or housing 145 to which the condenser 142 is fixed and a tank mounting part 146 on which a cooling tank 150 for making cold water is mounted may be provided in the condenser bracket 144. The condenser mounting part 145 provides a space having a shape corresponding to the whole shape of the condenser 142 to accommodate the condenser 142. Also, the condenser mounting part 145 has portions that are opened and face the cooling fan 143 and the discharge hole 112a to effectively cool the condenser 142.

Also, the tank mounting part or housing 146 is disposed on the condenser bracket 144, i.e., above the condenser mounting part 145. A lower end of the cooling tank 150 is inserted into the tank mounting part 146 to allow the tank mounting part 146 to fix the cooling tank 150.

The cooling tank 150 cools purified water to make cold water, and cooling water that is heat-exchanged with the introduced purified water is filled into the cooling tank 150. Also, an evaporator 151 for cooling the cooling water may be accommodated in the cooling tank 150. Also, the purified water may pass through the cooling tank 150 so as to be cooled.

A support plate 135 extending to the cooling tank 150 may be further provided at one side of the filter bracket 130. The support plate 135 may be disposed above the compressor 141 and extend from the filter bracket 130 up to the condenser bracket 144 to provide a space in which a heating and control module 160 and 170 are mounted.

The heating and control module 160 and 170 may include an induction heating assembly 160 for making hot water and a control assembly 170 for controlling an overall operation of the water purifier 10. The induction heating assembly 160 and the control assembly 170 may be coupled to each other to form one module and then be mounted on the support plate 135.

The induction heating assembly 160 may heat the purified water in an induction heating manner. The induction heating assembly 160 may immediately and quickly heat water when dispensing of hot water is manipulated and also may control an output of magnetic fields to heat the purified water at a desired temperature and thereby to provide the hot water to the user. Thus, hot water having a desired temperature may be dispensed according to the user's manipulation.

The control assembly 170 may control an operation of the water purifier 10. That is, the control assembly 170 may control the compressor 141, the cooling fan 143, various valves and sensors, and the induction heating assembly 160. The control assembly 170 may be provided as a module by combination of PCBs (printed circuit boards) that are divided into a plurality of parts for each function. Also, in a structure for dispensing only cold water and purified water from the water purifier 10, a PCB for controlling the induction heating assembly 160 may be omitted, and also, at least one or more PCBs may be omitted in the above-described manner.

Hereinafter, the water discharge module that is a portion of the component according to an embodiment will be described in more detail.

Figure 4:
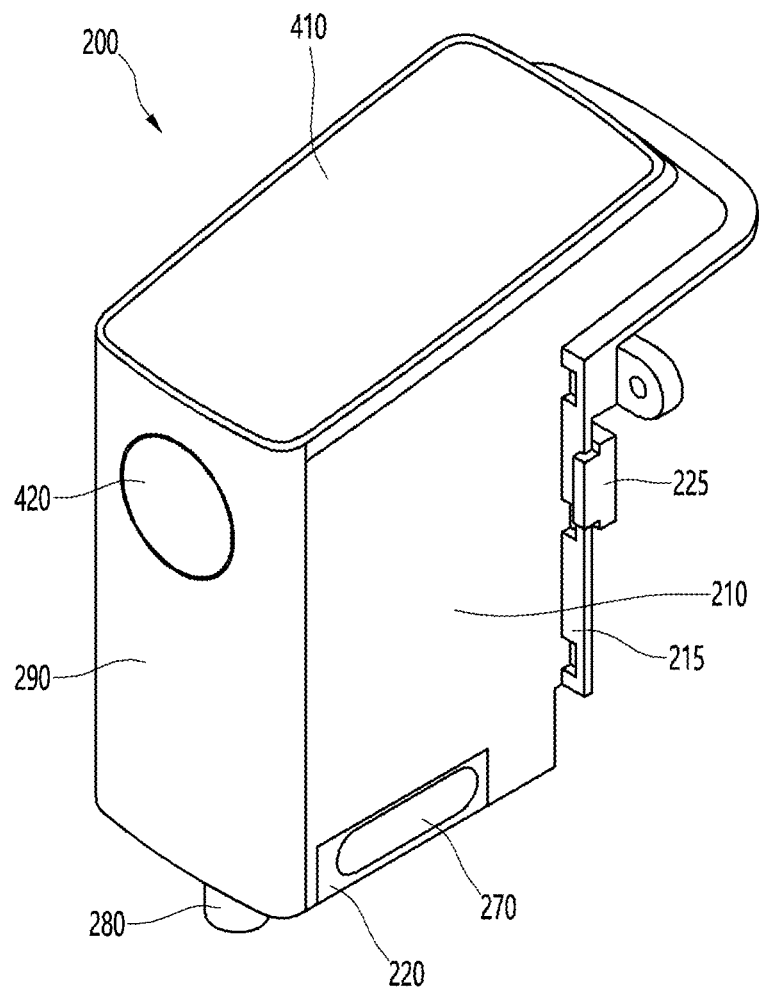
FIG. 4 is a perspective view of a water discharge module that is a portion of components according to an embodiment.

FIG. 4 is a perspective view of the water discharge module that is a portion of the components according to an embodiment. Also, FIG. 5 is an exploded perspective view of the water discharge module.

Figure 5:
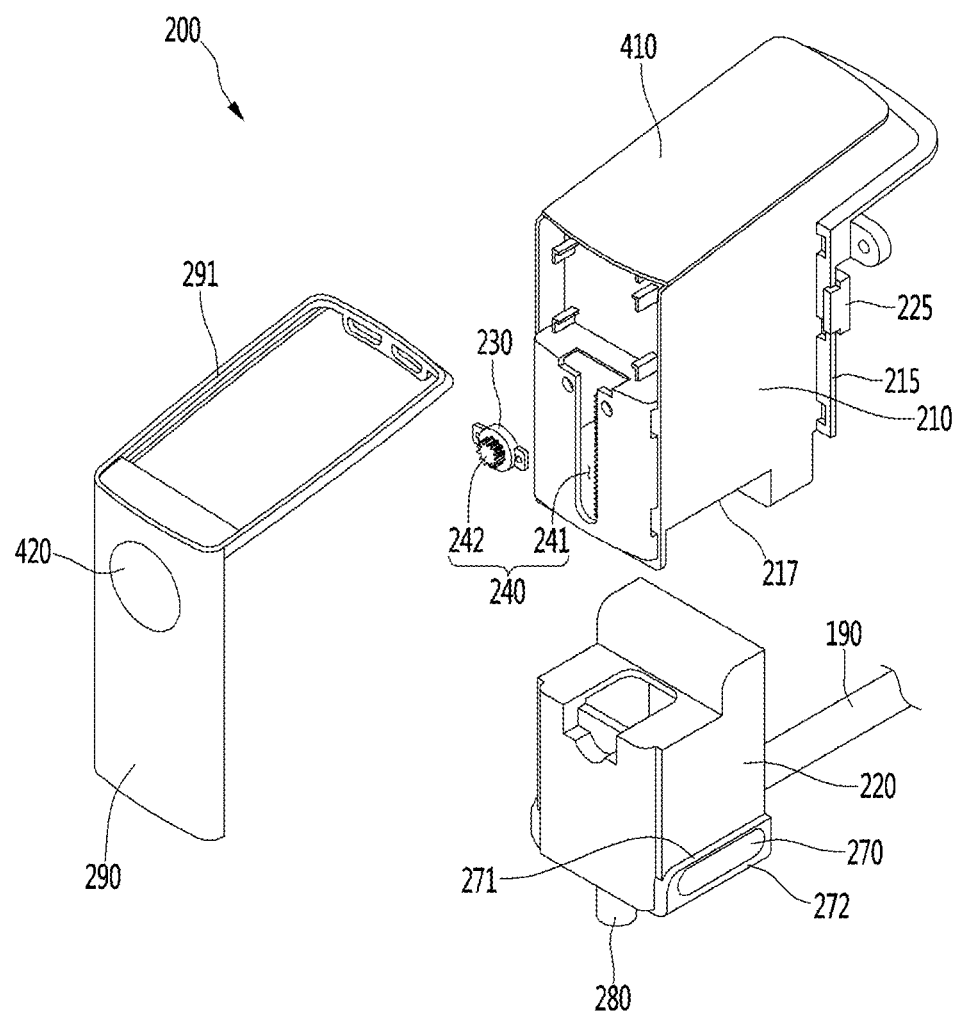
FIG. 5 is an exploded perspective view of the water discharge module.

Referring to FIGS. 4 and 5, the water discharge module 200 includes a fixed case 210 providing an elevation space in a vertical direction, having a lower side so that the elevation space 211 communicates with the outside so as to provide an opening, and fixed to the water purifier body 100, a movable case 220 to which the water discharge nozzle 280 is fixed and which is accommodated in the elevation space or opening 211 of the fixed case 210 so as to be elevated, and a resistance unit 230 provided in the fixed case 210 or the movable case 220 to reduce elevation force, which is applied to the movable case 220, to allow the movable case to ascend or descend.

The fixed case 210 is detachably fixed to the water purifier body 100 and supports the movable case 220 so that the movable case 220 is elevatable in the state of being fixed to the water purifier body 100. Thus, the movable case 220 may be elevated in the state of being supported to the water purifier 10 by the fixed case 210.

Also, the fixed case 210 may have the elevation space or space 211 in which the movable case 220 is accommodated, and the lower end of the elevation space 211 may be opened to communicate with the outside. Thus, the movable case 220 accommodated in the elevation space 211 may be adjustably attached to the fixed case to appear or disappear downward from the fixed case 210 so as to afford vertical adjustment of the movable case within the space.

In this embodiment, the fixed case 210 may have an opened rear surface (a right side in the drawing) connected to the water purifier body 100. For example, the fixed case 210 may include a front part and a side part extending backward from each of both sides of the front part.

The water discharge nozzle 280 is fixed to a lower end of the movable case 220, and the movable case 220 is accommodated into the elevation space 211 of the fixed case 210 and thus elevated while coming into contact with and being supported by the fixed case 210.

The movable case 220 may have an outer appearance corresponding to that of the elevation space 211 of the fixed case 210. For example, each of the fixed case 210 and the movable case 220 may have a rectangular cross-section. For another example, each of the fixed case 210 and the movable case 220 may have a circular cross-section. Respectively, each of the fixed case 210 and the movable case 220 may have various cross-sections.

In this embodiment, the movable case 220 may have an opened rear surface (a right side in the drawing) facing the water purifier body 100. When the rear surface of the movable case 220 is opened as described above, an inner space of the water purifier body 100 may communicate with an inner space of the movable case 220, and thus, a supply hose or supply line 190 for supplying at least one of purified water, cold water, and hot water, which are generated in the water purifier body 100, to the water discharge nozzle 280 provided in the movable case 220 may be connected.

For example, the movable case 220 may include a front part and a side part extending backward from each of both sides of the front part.

Also, the fixed case 210 and the movable case 220 may have a projection part and a groove part at positions corresponding to each other in the elevation direction or direction of the vertical adjustment of the movable case 220, respectively. Thus, straight movement of the movable case 220 may be guided while coupling force between the fixed case 210 and the movable case 220 increases.

Here, when the groove part is provided in the fixed case 210, the projection part inserted into the groove part may be provided on the movable case 220.

On the other hand, when the projection part is provided on the fixed case 210, the groove part into which the projection part is inserted may be provided in the movable case 220.

The resistance unit 230 may be disposed on the fixed case 210 or the movable case 220. The resistance unit 230 may reduce elevation force, which is applied to the movable case 220, to allow the movable case 220 to ascend or descend.

Here, "the elevation force applied to the movable case 220" may mean all force having an influence on the elevation operation of the movable case 220.

For example, the elevation force may include force pulling the movable case 220 downward so that the movable case 220 descends or force pushing the movable case 220 upward so that the movable case 220 ascends. Also, the elevation may include force for allowing the movable case 220 to descend by gravity.

As described above, when the movable case 220 is elevated with respect to the fixed case 210, the movable case 220 may randomly descend by a self-weight. That is, in the state in which the movable case 220 is completely accommodated in the fixed case 210, the movable case 220 descends out of the fixed case 210 by the self-weight of the movable case 220. In addition, in a state in which the user holds the movable case 220 to allow the movable case 220 to descend up to a desired position, when a user's hand leaves from the movable case 220, the movable case 220 may randomly further descend by the self-weight thereof without being fixed to the position. That is, it is difficult to maintain a height of the movable case 220.

According to an embodiment, to prevent this phenomenon, the resistance unit 230 is provided on the fixed case 210 and the movable case 220.

The resistance unit 230 may reduce the elevation force, which is applied to the movable case 220, to allow the movable case to ascend or descend.

Thus, in the state in which the movable case 220 is completely accommodated in the fixed case 210, the movable case 220 may be maintained in the accommodated state without randomly descending by the self-weight thereof. Also, in the state in which the user holds the movable case 220 to allow the movable case 220 to descend up to a desired position, although the user's hand leaves from the movable case 220, the movable case 220 may be fixed to the position. Thus, the water discharge nozzle 280 may be disposed at a height that is desired by the user to dispense water.

Here, the resistance unit 230 may be selected within a range in which the user does not exert excessive force to manipulate the elevation of the movable case 220 while preventing the movable case 220 from descending by the self-weight. Also, the resistance unit 230 may be adopted within a range in which user's operational sensitivity for elevating the movable case 220 is improved.

For example, the resistance unit or damper 230 may be made of a rubber material having friction force and an oil material having viscosity. Alternatively, the resistance unit 230 may be variously adopted within a range in which the elevation force applied to the movable case 220 is reduced.

An example of the resistance unit 230 will be described below in detail.

Also, according to an embodiment, a manipulation part 410 may be disposed on a top surface of the water discharge module 220, and the water discharge button 420 may be disposed on a front surface of the water discharge module 220.

As described above, to provide the manipulation part 410 to the top surface of the water discharge module 220, an accommodation space in which the manipulation part 410 is accommodated may be defined in the top surface of the fixed case 210.

According to an embodiment, the manipulation part 410 may be disposed on the top surface of the water discharge module 220. Thus, tall adults may easily adjust an overall operation of the water purifier 10. On the other hand, short child may not recognize the manipulation part 410 disposed on the top surface of the water discharge module 220 and also prevent safety accidents such as burning of the hand due to hot water from occurring when the child randomly push the manipulation part 410 to dispense the hot water.

On the other hand, the water discharge button 420 may be disposed on the front surface of the water discharge module 220. Thus, all the adults and the short child may recognize the water discharge button 420 and also easily manipulate the water discharge button 420 to dispense water when discharge of the water is required.

Also, the water discharge module 220 may further include a front case 290 covering a front surface of the fixed case 210.

As described above, when the front case 290 covers the front surface of the water discharge module, since components such as a resistance unit 230 and a guide part 240, which will be described later, are not exposed to the outside, the water discharge module 220 may be maintained with an elegant outer appearance.

Also, the front case 290 may be detachably coupled to the fixed case 210. Thus, as necessary, the front case 290 may be separated from the fixed case 210 to check the resistance unit 230 and the guide part or guide assembly 240. For example, the front case 290 and the fixed case 210 may be coupled to each other by using a hook in a detachable manner.

Also, the front case 290 may include an upper border 291 coupled to an upper end of the fixed case 210. The manipulation part 410 may be accommodated inside the border 291. The border 291 may be provided to improve coupling force between the front case 290 and the fixed case 210.

In this embodiment, a water discharge button exposing hole is defined in the front case 290 to allow the water discharge button 420 to be exposed to the outside of the front case 290.

Also, the water discharge nozzle 280 may be made of a stainless steel material.

As described above, when the water discharge nozzle 280 is made of the stainless steel material, the water discharge nozzle 280 may be hygienic because it does not rust and prevent damage and deformation from being occurring due to the frequent use. Also, the water purifier 10 may be elegant in outer appearance and also additionally realize a luxurious image.

Also, the water discharge nozzle 280 may be integrated with the movable case 220 or a connection member 281 connecting the movable case 220 to the water discharge nozzle 280 through an insert injection manner.

Here, the connection member 281 may be a part connecting the water discharge nozzle 280 to the supply hose 190 and be detachably coupled to the movable case 220.

As described above, when the water discharge nozzle 280 is integrated with the movable case 220 or the connection member 281 through the insert injection manner, coupling force between the water discharge nozzle 280 and the movable case 220 or connection member 281, furthermore, the supply hose 190 may increase to prevent water from leaking. Also, the manufacture may be facilitated when compared to the existing assembly method.

Figure 6:
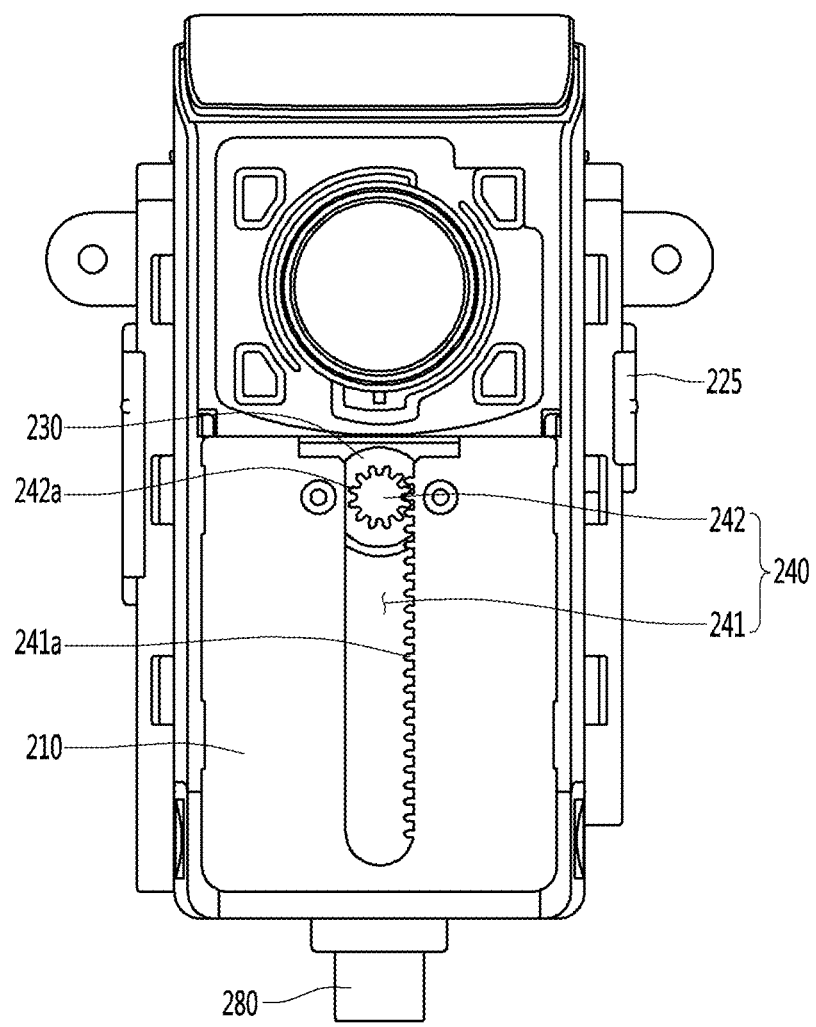
FIG. 6 is a front view illustrating a state in which a movable case of the water discharge module ascends.
Figure 7:
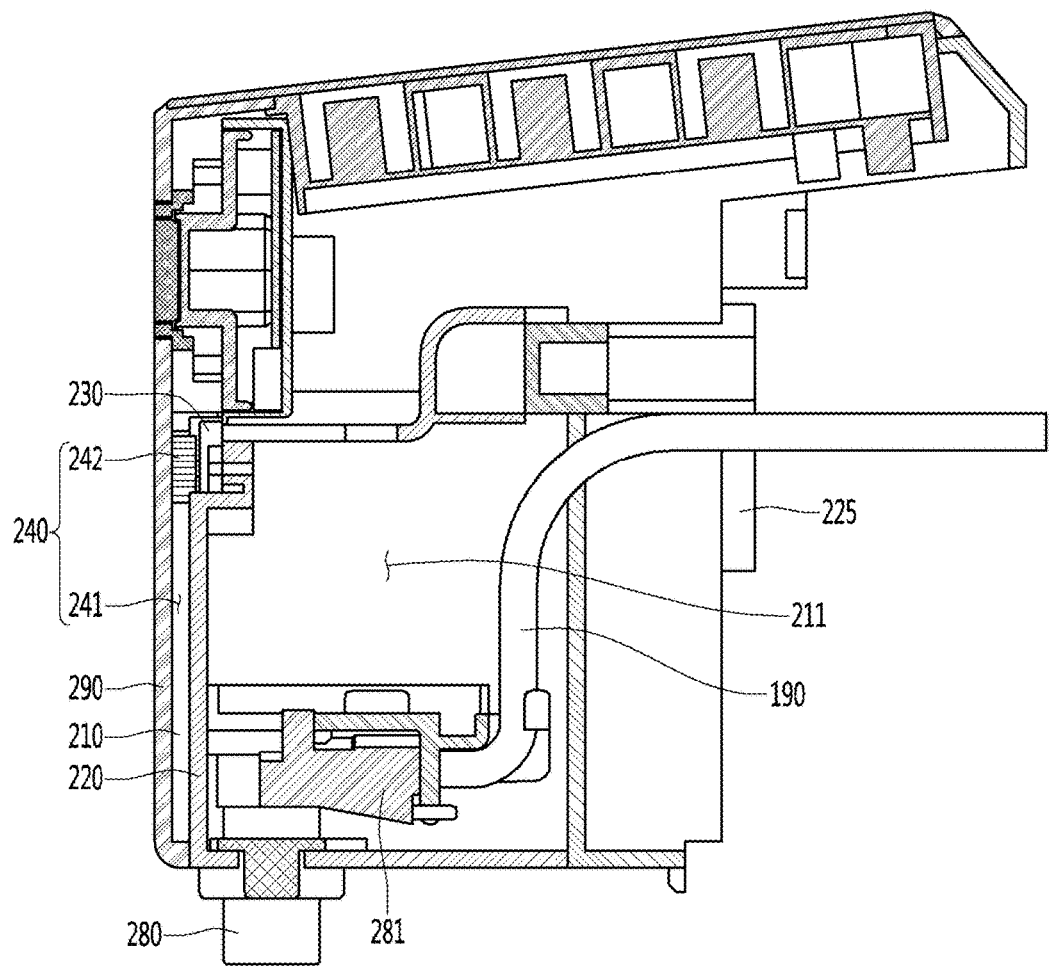
FIG. 7 is a longitudinal cross-sectional view illustrating the state in which the movable case of the water discharge module ascends.
Figure 8:
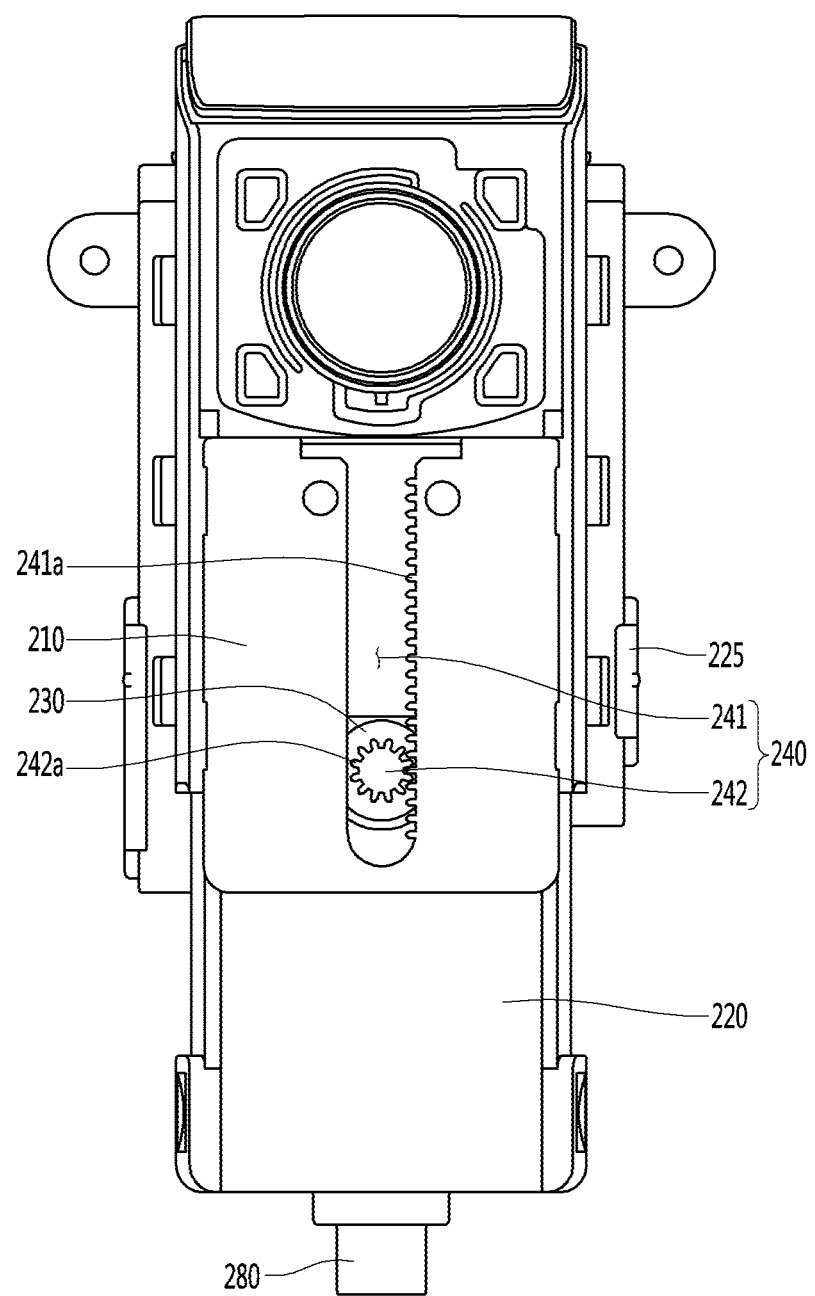
FIG. 8 is a front view illustrating a state in which the movable case of the water discharge module descends.
Figure 9:
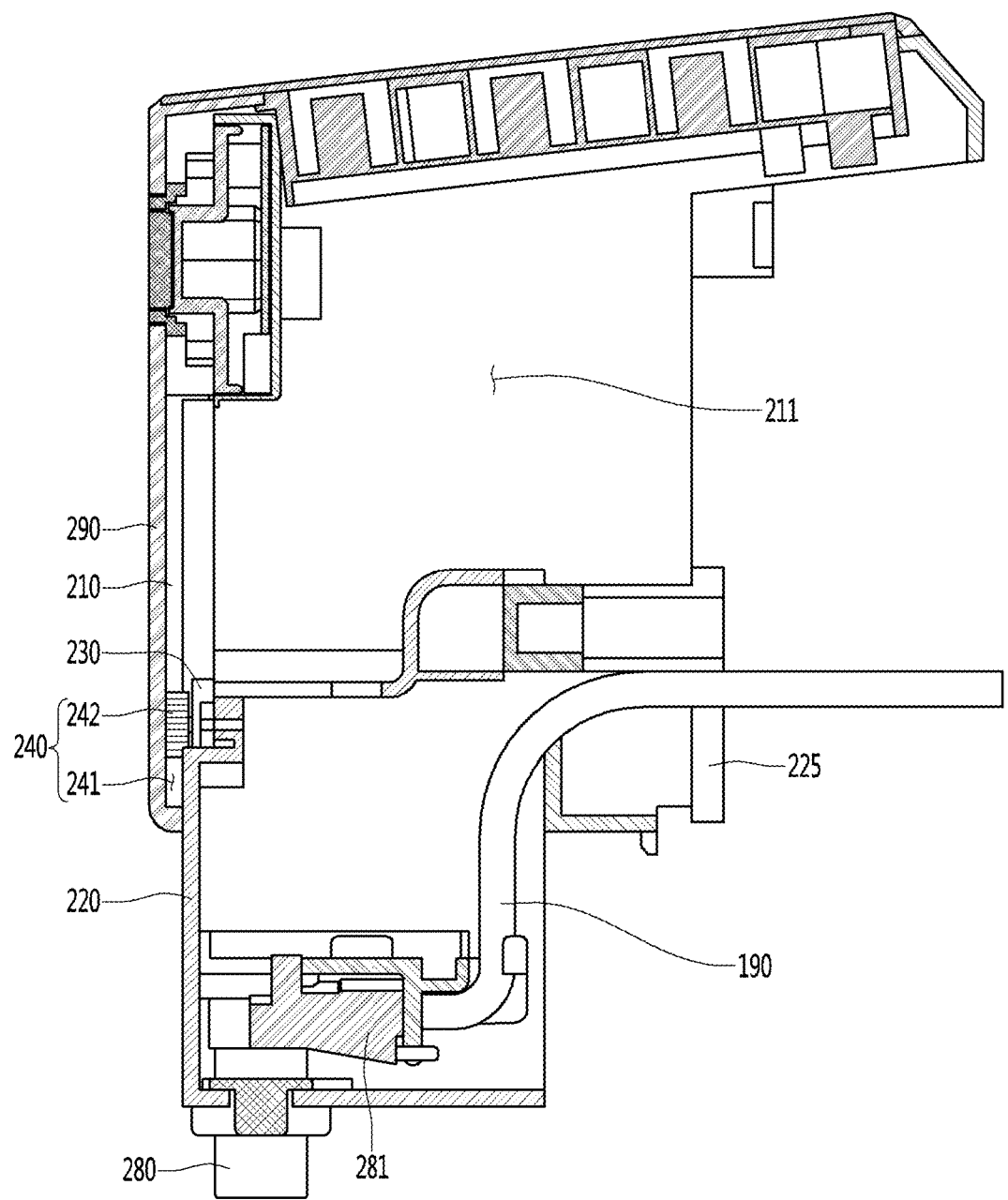
FIG. 9 is a longitudinal cross-sectional view illustrating the state in which the movable case of the water discharge module descends.

FIG. 6 is a front view illustrating a state in which the movable case of the water discharge module ascends, and FIG. 7 is a longitudinal cross-sectional view illustrating the state in which the movable case of the water discharge module ascends. Also, FIG. 8 is a front view illustrating a state in which the movable case of the water discharge module descends, and FIG. 9 is a longitudinal cross-sectional view illustrating the state in which the movable case of the water discharge module descends.

Referring to FIGS. 6 to 9, the guide part 240 for guiding the movable case 220 to be elevated may be disposed on the fixed case 210 or the movable case 220.

Since the movable case 220 is elevated in the movable case 220 is accommodated in the fixed case 210, the movable case 220 may be straightly elevated by the fixed case 210. However, when the movable case 220 is exposed to the outside of the fixed case 210 and thus is slightly shaken in a horizontal direction, the elevation operation of the movable case may be instable. If this phenomenon is repeated, the fixed case 210 or the movable case 220 may be deformed or damaged.

According to this embodiment, to prevent this phenomenon from occurring, the separate guide part 240 is provided.

The guide part 240 may be variously adopted within a range in which the guide part 240 guides the straight elevation of the movable case 220 while the movable case 220 is supported by the fixed case 210.

For example, the guide part 240 may include a straight rail vertically disposed on the fixed case 210 and a roller disposed on the movable case 220 to travel along the straight rail.

Alternatively, the guide part 240 may include a straight rail vertically disposed on the movable case 220 and a roller disposed on the fixed case 210 to travel along the straight rail.

Alternatively, the guide part 240 may include a guide groove 241 defined in the fixed case 210 in the elevation direction and a guide piece 242 disposed on the movable case 220 and inserted into the guide groove 241.

Alternatively, the guide part 240 may include a guide groove defined in the movable case 220 in the elevation direction and a guide piece provided on the fixed case 220 and inserted into the guide groove.

Here, the guide piece 242 may be inserted into the guide groove 241 having a linear shape to straightly move along the guide groove 241. Thus, the movable case 220 may be straightly elevated.

Also, the guide piece 242 may be rotatably mounted on the movable case 220.

As described above, when the guide piece 242 is rotatably mounted on the movable case 220, friction force between the guide piece 242 and the guide groove 241 may be minimized, and then, the movable case 220 may be straightly elevated along the guide groove 241. Thus, the movable case 220 may be smoothly elevated, and the user may feel improved operational sensitivity.

Also, first gear teeth 241a may be disposed inside the guide groove 241, and second gear teeth 242a engaged with the first gear teeth 241a may be disposed on an outer circumferential surface of the guide piece 242.

That is, the guide groove 241 and the guide piece 242 may be engaged with each other in a rack and pinion manner. The guide piece 242 may be straightly elevated along the guide groove 241 while rotating.

For example, when the user pulls the movable case 220 downward, the guide piece 242 may rotate in a counter-clockwise direction in the drawings to descend along the guide groove 241 in the state in which the gear teeth 241a and 242a are engaged with each other.

Alternatively, when the user pushes the movable case 220 upward, the guide piece 242 may rotate in a clockwise direction in the drawings to ascend along the guide groove 241 in the state in which the gear teeth 241a and 242a are engaged with each other.

As described above, when the gear teeth 241a and 242a are provided, since the gear teeth 241a and 242a are engaged with each other, the guide piece 242 may be more accurately straight elevated along the guide groove 241 while rotating. As a result, the movable case 220 may be more accurately straightly elevated. Also, to prevent the guide piece 242 from idling in the guide groove 241, the movable case 220 may be accurately elevated to a height that is desired by the user.

Also, the first gear teeth 241a or the second gear teeth 242a may include a linear section or a curved section, which has a shape that is perpendicular to or inclined in the elevation direction of the movable case 220. Particularly, a portion or the whole of the first gear teeth 241a or the second gear teeth 242a may have a curved shape.

As described above, when each of the first gear teeth 241a or the second gear teeth 242a has a curved shape, the first gear teeth 241a and the second gear teeth 242a may be smoothly engaged with each other to allow the user to feel the improved operational sensitivity. Also, while the user holds the movable case 220 to elevate the movable case 220, the first gear teeth 241a or the second gear teeth 241b may be prevented from being damaged by force applied to the first gear teeth 241a or the second gear teeth 241b.

If each of the first gear teeth 241a or the second gear teeth 241b has a linear shape to provide a sharp corner, the force may be concentrated into the sharp corner to damage the sharp corner.

For example, each of the first gear teeth 241a or the second gear teeth 241b may have an uneven portion that protrudes or is recessed in a semicircular shape.

In addition, each of the first gear teeth 241a or the second gear teeth 241b may have various shapes so that the second gear teeth 242a are engaged with the first gear teeth 241a to securely transmit power, and the guide piece 242 straightly moves along the guide groove 241.

Also, the resistance unit or damper 230 may be provided as an oil damper, such as a "dashpot," for example.

The oil damper may mean a device in which an oil is provided in the housing to absorb energy through viscosity resistance of the oil.

As described above, the oil damper may include, for example, a cylindrical housing, an oil filled into the housing and having predetermined viscosity, a rotation wing having a plurality of through-holes, through which the oil passes, and disposed in parallel to a radial direction of the housing, and a rotation shaft connected to the rotation wing.

Thus, when rotation force is supplied to the rotation shaft, the rotation force may be reduced by the viscosity resistance of the oil.

Figure 10:
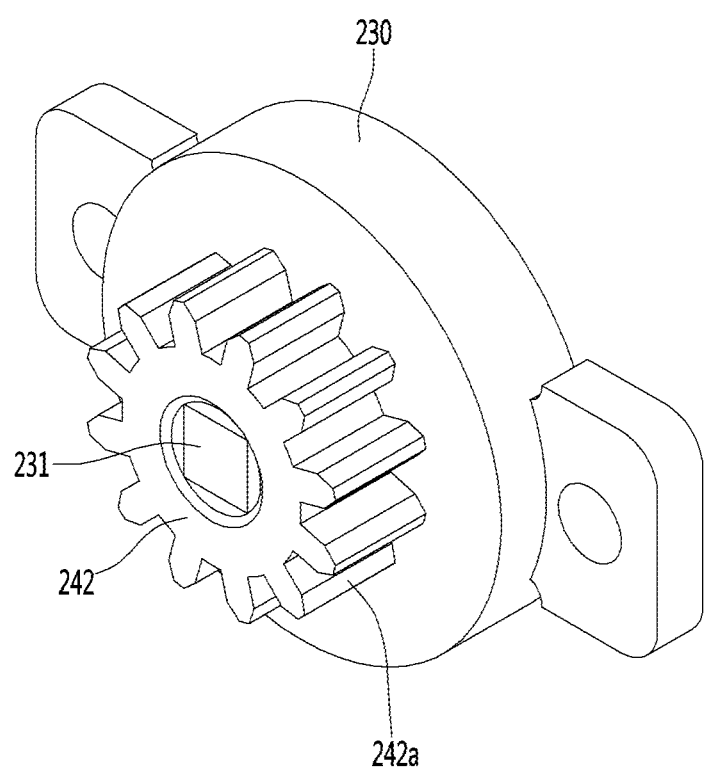
FIG. 10 is a perspective view illustrating a state in which a resistance unit and a guide piece, which are portions of components, are connected to each other according to an embodiment.

FIG. 10 is a perspective view illustrating a state in which the resistance unit and the guide piece, which are portions of the components, are connected to each other according to an embodiment.

As illustrated in FIG. 10, the resistance unit 230 may be provided as the oil damper, and the guide piece 242 may be connected to the rotation shaft 231 of the resistance unit 230.

That is, when the elevation force is applied to movable case 220 to allow the movable case 220 to ascend or descend, the guide piece 242 rotatably connected to the movable case 220 may rotate.

Here, the rotation force of the guide piece 242 is reduced by the resistance unit 230, i.e., the oil damper.

Thus, in the state in which the movable case 220 is completely accommodated in the fixed case 210, the movable case 220 may be maintained in the accommodated state without randomly descending by the viscosity resistance of the resistance unit 230. Also, in the state in which the user holds the movable case 220 to allow the movable case 220 to descend up to a desired position, although the user's hand leaves from the movable case 220, the movable case 220 may be fixed to the position by the viscosity resistance of the resistance unit 230.

Here, the oil viscosity of the oil damper may be variously adjusted within a range in which the user exerting an externally applied force does not exert excessive force to manipulate the elevation of the movable case 220 while the resistance unit 230 prevents the movable case 220 from descending by the self-weight. Also, the oil viscosity of the oil damper may be variously adjusted within a range in which the user feels the improved operational sensitivity.

Figure 11:
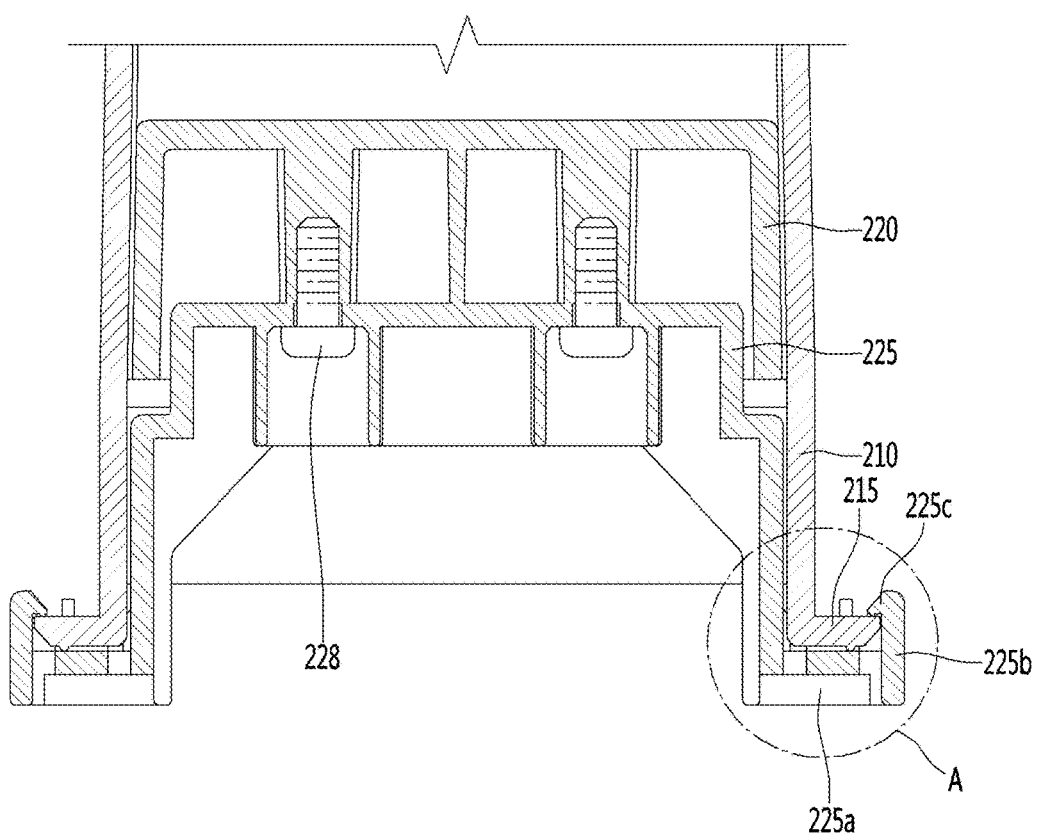
FIG. 11 is a transversal cross-sectional view of a water discharge module that is a portion of components according to an embodiment.

FIG. 11 is a transversal cross-sectional view of the water discharge module that is a portion of components according to an embodiment. Also, FIG. 12 is an enlarged view of an area A of FIG. 11.

Figure 12:
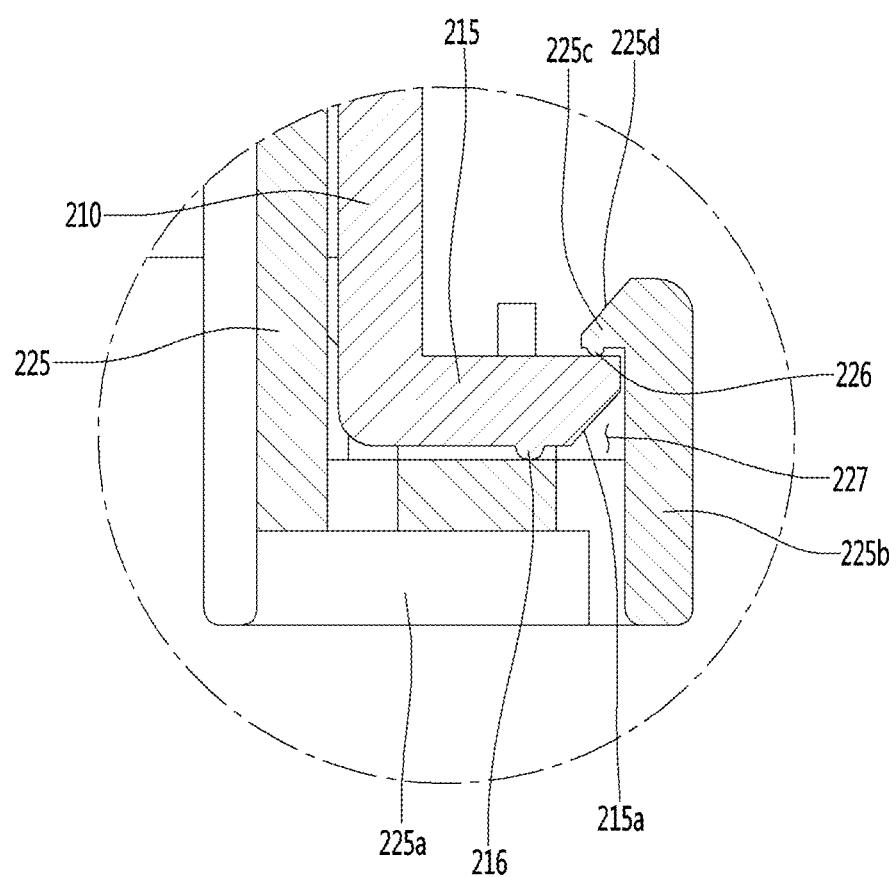
FIG. 12 is an enlarged view of an area A of FIG. 11.

Referring to FIGS. 11 and 12, the fixed case 210 and the movable case 220 may come into line contact with each other.

Here, the "line contact" may mean a point contact between the fixed case 210 and the movable case 220 as illustrated in the cross-sectional views of FIGS. 11 and 12, and then, the point contact is continuously connected in the elevation direction of the movable case 220 to form a linear contact between the fixed case 210 and the movable case 220 along the elevation direction of the movable case 220.

For this, at least one or more contact projections 216 and 226 may be disposed on the fixed case 210 or the movable case 220 in the elevation direction of the movable case 220.

For example, when the contact projection 216 is disposed on the fixed case 210, the contact projection 216 may come into line contact with the movable case 220. For another example, when the contact projection 226 is disposed on the movable case 220, the contact projection 226 may come into line contact with the fixed case 210.

For another example, when the contact projection 216 is disposed on the fixed case 210, a contact groove may be defined in the movable case 220 at a position corresponding to the contact projection 216. Also, when the contact projection 226 is disposed on the movable case 220, a contact groove may be defined in the fixed case 210 at a position corresponding to the contact projection 226.

As described above, when the fixed case 210 and the movable case 220 come into line contact with the contact projections 216 and 226, the friction force between the fixed case 210 and the movable case 220 may be minimally reduced, and also, the fixed case 210 and the movable case 220 may be contact-supported to each other to allow the movable case 220 to be stably elevated. Also, the deformation of the fixed case 210 and the movable case 220 such as warpage may be maximally prevented by the contact support therebetween.

For example, each of the contact projections 216 and 226 may have a transversal cross-section having a convex semi-circular shape. When each of the contact projections 216 and 226 has a curved shape as described above, the movable case 220 may be more smoothly elevated in the state in which the fixed case 210 and the movable case 220 come into line contact with each other.

Also, the fixed case 210 may include a wing part 215 extending outward from each of both sides of a rear portion thereof, and the movable case 220 may include an extension part 225a extending in parallel to the wing part 215 from each of both sides of the rear portion of the movable case 220 and a bent part 225b extending to be bent forward from the extension part 225a and have an end on which a hook 225c is disposed inward. Thus, the wing part 215 may be accommodated in the accommodation groove 227 between the extension part 225a and the hook 225c.

The end of the fixed case 210 may be reinforced by the wing part 215 and thus be prevented from being deformed such as warpage.

Also, an accommodation groove 227 in which the wing part 215 is accommodated may be defined in the movable case 220 to improve the coupling force with the fixed case 210 and thereby to prevent the movable case 220 from being separated from the fixed case 210 and prevent the movable case 220 and the fixed case 210 from being mutually deformed.

Also, when the wing part 215 is disposed on the fixed case 210, and the hook 225c is disposed on the movable case 220, the movable case 220 and the fixed case 210 may be detachably coupled to each other in the hook manner.

In this embodiment, the movable case 220 may include a guide member 225.

Here, the guide member 225 may be coupled to the movable case 220 through a coupling unit 228 such as a bolt.

Also, the extension part 225a, the bent part 225b, and the hook 225c may be disposed on each of both sides of the guide member 225.

Thus, the guide member 225 may be elevated along the fixed case 210, and the movable case 220 connected to the guide member 225 may also be elevated along the fixed case 210.

Also, the first contact projection 216 may be disposed on a surface of the wing part 215 facing the extension part 225a in the elevation direction of the movable case 220. The first contact projection 216 may come into line contact with the extension part 225a.

Also, the second contact projection 226 may be disposed on a surface of the hook 225c facing the wing part 215 in the elevation direction of the movable case 220. The second contact projection 226 may come into line contact with the wing part 215.

When the first contact projection 216 and the second contact projection 226 are provided as described above, the fixed case 210 and the movable case 220 may doubly come into line contact with each other, and the movable case 220 may be elevated. Thus, the movable case 220 may be stably elevated without being shaken in a front and rear direction.

Also, since the wing part 215 is accommodated in the accommodation groove 227, the bent part 225b may be supported by the wing part 215 to allow the movable case 220 to be stably elevated without being shaken in the front and rear direction.

Also, inclined surfaces 215a and 225d that are parallel to each other may be disposed on a front surface of the hook 225c and a rear surface of the wing part 215.

When the inclined surfaces 215a and 225d are respectively disposed on the hook 225c and the wing part 215 as described above, the movable case 220 may be easily inserted forward from a front side of the fixed case 210.

For example, each of the fixed case 210 and the movable case 220 may have a rear surface that is in an opened state.

Here, although the movable case 220 is inserted from a rear side of the fixed case 210, if the wing part 215 and the hook 225c are provided, the movable case 220 may not be smoothly inserted due to an interference therebetween.

To prevent this phenomenon, the inclined surfaces 215a and 225d that are parallel to each other may be respectively disposed on the front surface of the hook 225c and the rear surface of the wing part 215 so that the movable case 220 is easily inserted forward from the rear side of the fixed case 210.

Also, a handle part or handle portion 272 protruding outward may be disposed on a lower end of each of both sides of the movable case 220, and a seating groove 217 in which the handle part 272 is seated may be defined in a lower end of each of both sides of the fixed case 210.

Here, a stepped portion 271 may be disposed on an upper portion of the handle part 272. Thus, when the user holds the handle part 272 to allow the movable case 220 to ascend, the stepped portion 271 of the handle part 272 may be hung on the seating groove 217. As a result, the seating groove 217 may serve as a topper for suppressing an ascending height of the movable case 220.

Also, a grasping groove 270 that is recessed inward may be defined in the handle part 272.

When the grasping groove 270 is provided as described above, the user may hold the grasping groove 270 to allow the movable case 220 to ascend or descend. Here, the movable case 220 may ascend or descend by the user without being slid.

For another example, an unevenness (ᑎᑎᑎᑎ) for preventing the sliding when the movable case 220 ascends or descends or a grasping projection protruding outward may be disposed on the handle part 272.

Also, at least one of the fixed case 210 and the movable case 220 may be made of an engineering plastic material having superior fatigue resistance, toughness, and abrasion resistance and lubricity.

For example, at least one of the fixed case 210 and the movable case 220 may be made of a polyoxymethylene (POM) material.

Thus, when the movable case 220 is elevated within the fixed case 210, abrasion and noises due to the friction between the fixed case 210 and the movable case 220 may be reduced.

Also, when the user pulls the movable case 220 downward to allow the movable case to descend or allows the descending movable case 220 to ascend, the movable case 220 may be smoothly elevated to improve the operational sensitivity.

Figure 13:
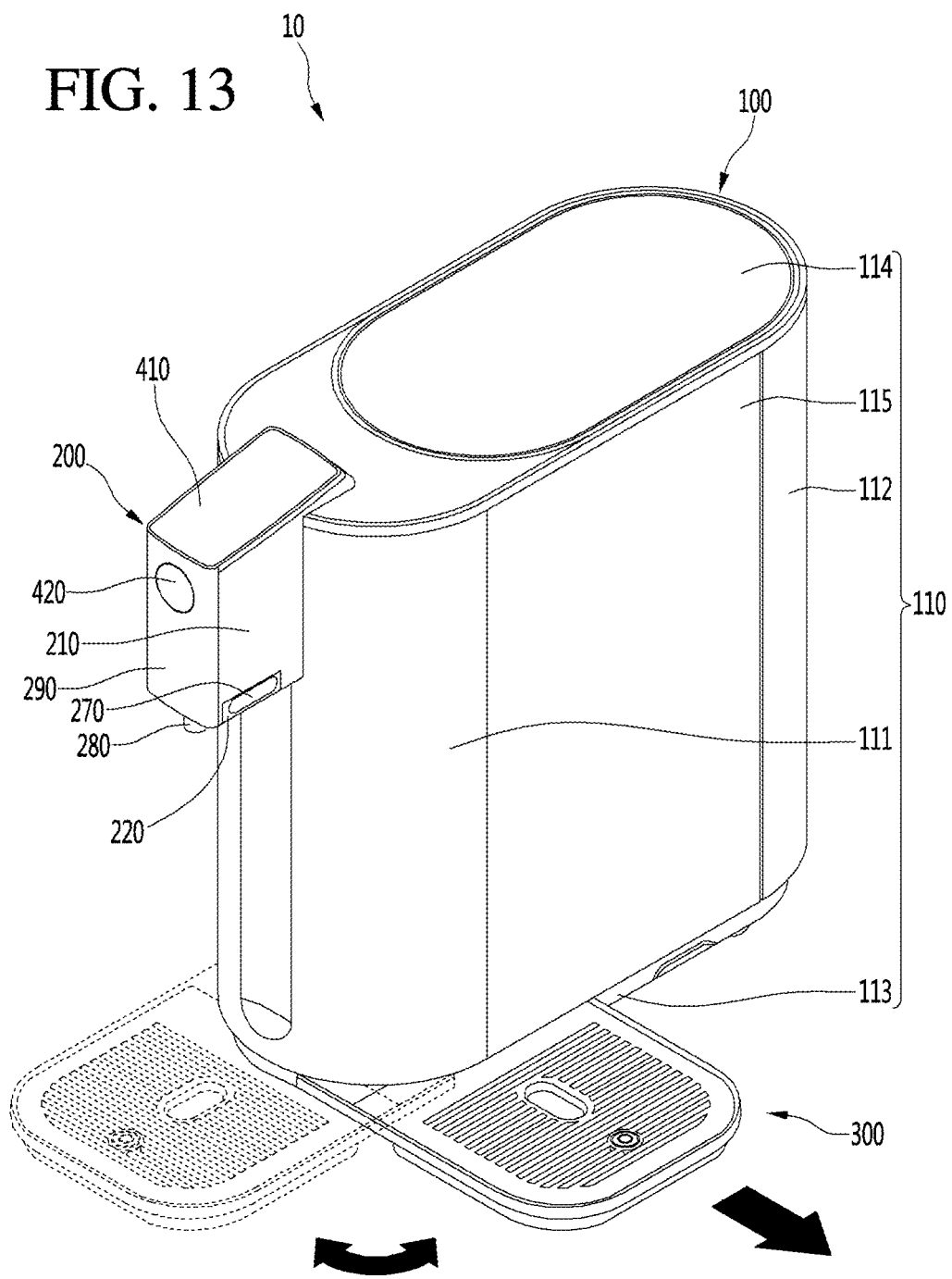
FIG. 13 is a perspective view illustrating a state in which a tray of the water purifier rotates.
Figure 14:
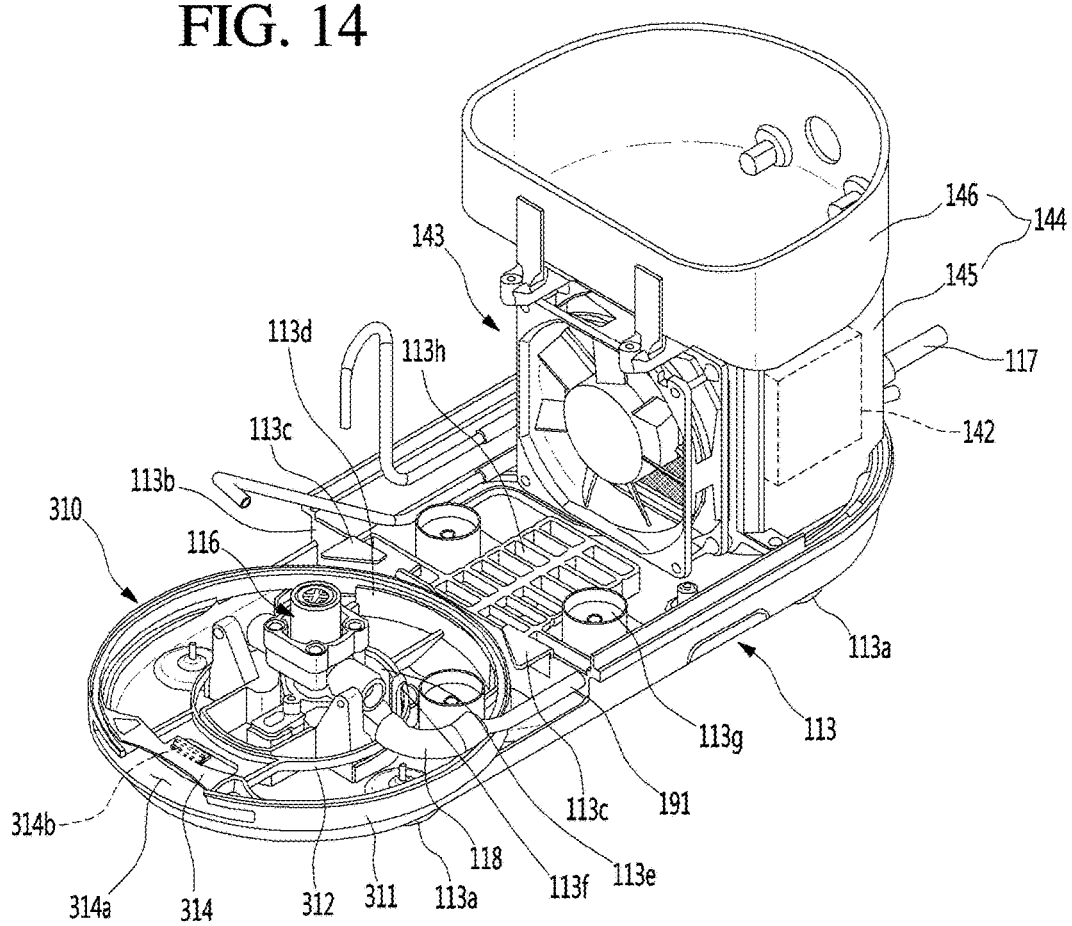
FIG. 14 is a perspective view illustrating a base of the water purifier.
Figure 15:
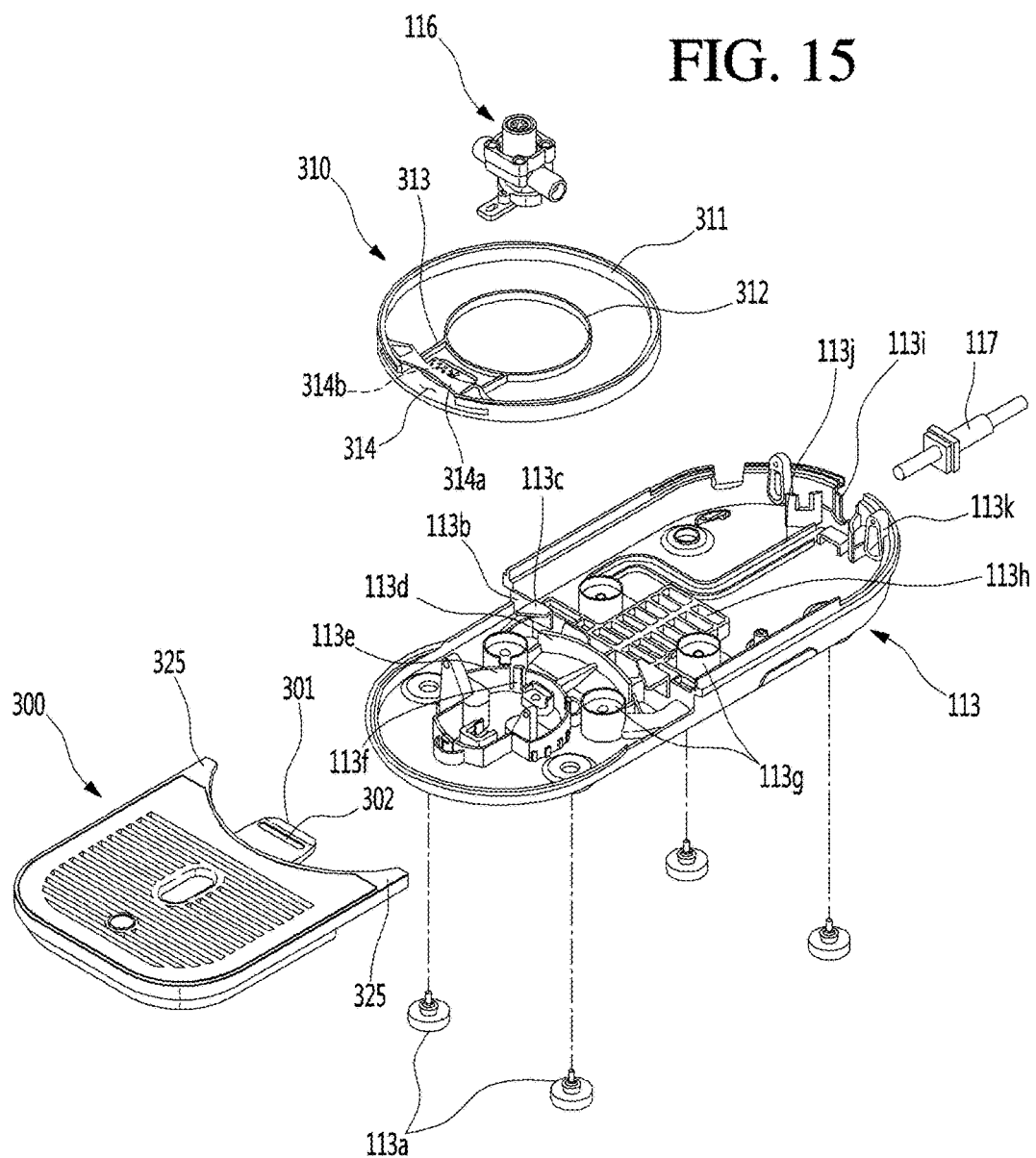
FIG. 15 is an exploded perspective view illustrating a coupling structure of the base and the tray.

FIG. 13 is a perspective view illustrating a state in which a tray of the water purifier rotates. Also, FIG. 14 is a perspective view illustrating a base of the water purifier. Also, FIG. 15 is an exploded perspective view illustrating a structure in which the base and the tray are coupled to each other.

The tray 300 protrudes forward from the front cover 111 and is connected to the base 113. Also, the tray 300 may be disposed just below the water discharge module 200. Also, the tray 300 may rotate by the user's manipulation and be separated from the base 113. The tray 300 may have a top surface that has a grill shape so that water dropping from the water discharge module 200 is stored.

For this, a rotatable ring 310 that is rotatably mounted is disposed on the base 113, and the tray 300 is detachably connected to the rotatable ring 310. Thus, the tray 300 may be rotatably manipulated in the state of being mounted. Also, if necessary, the tray 300 may be separated from the rotatable ring 310. Also, in the state in which the tray 300 is coupled to the rotatable ring 310, the tray 300 may protrude forward from the base 113.

Hereinafter, the base 113 and the tray 300 will be described in detail.

Referring to FIGS. 10 to 12, the base 113 defines a bottom surface of the water purifier 10. Also, a circumference of the base 113 may extend upward to be coupled to the side panel 115, the front cover 111, and the rear cover 112.

A leg 113a protruding downward may be disposed on the base 113. The leg 113a may be provided in plurality on the base 113 so that the entire bottom surface of the base 113 is spaced apart from the ground. Thus, external air may be easily suctioned through the bottom surface of the base 113.

The rotatable ring 310 may be rotatably mounted on a front portion of the base 113. The tray 300 may be detachably coupled to one side of a front portion of the rotatable ring 310 and connected to the rotatable ring 310 to rotate in a left and right direction.

The front portion of the base 113 may be stepped at a height less than that of a rear portion of the base 113. Also, an opening may be defined between the front portion of the base 113 and the lower end of the front cover 111, and a side part of the tray 300 may be exposed to the outside through the opening. Thus, the tray 300 may rotatable in the left and right direction in the state of being coupled to the rotatable ring 310.

Also, the stepped portion between the front portion and the rear portion of the base 113 may serve as a stopper 113b for suppressing a rotation angle of the tray 300 when the tray 300 rotates. Also, when the tray 300 rotates, both side surfaces of the tray 300 may come into contact with the stopper 113b to suppress the rotation of the tray 300.

Also, a movement prevention part 113c for preventing the tray 300 from vertically moving extends forward from the stopper 113b of the base 113. The movement prevention part 113c may restrict both sides of the rear end of the tray 300 in the state in which the tray 300 rotates.

A rotation guide part is disposed in the base 113. The rotation guide part may include a first rotation guide part 113d and a second rotation guide part 113e, which are concentrically disposed on the base 113. The first rotation guide part 113d may be disposed outside the second rotation guide part 113e. Each of the first rotation guide part 113d and the second rotation guide part 113e may protrude upward at a predetermined curvature from the bottom surface of the base 113 to guide the rotation of the rotatable ring 310. Each of the rotation guide parts 113d and 113e may have a circular shape or an arc shape.

The rotatable ring 310 may be guided by the rotation guide parts 113d and 113e and mounted rotatable with respect to the base 113 to support the tray 300. The rotatable ring 310 may include an outer ring part 311, an inner ring part 312, and a ring joint part 313.

The outer ring part 311 may provide an outer frame and shape of the rotatable ring 310. The outer ring part 311 has a circular shape, and at least a portion of the outer ring part 311 comes into contact with an outer surface of the first rotation guide part 113d and is rotatably mounted along the first rotation guide part 113d.

Also, the inner ring part 312 is concentrically disposed within the outer ring part 311. The inner ring part 312 has a circular shape, and at least a portion of the inner ring part 312 comes into contact with an outer surface of the second rotation guide part 113e to suppress the movement of the base in the front and rear direction. Also, the inner ring part 312 is guided by the second rotation guide part 113e and thus rotatably mounted in place.

A tray mounting part 314 is disposed at one side of the outer ring part 311 so as to be coupled to the tray 300. The tray mounting part 314 may have an accommodation hole 314a having the same size and shape as a tray coupling part 301 of the tray 300. The accommodation hole 314a is opened in a direction facing the tray coupling part 301 so that the tray coupling part 301 is inserted into and coupled to the tray mounting part 314 through the accommodation hole 314a.

When the tray coupling part 301 is inserted into and coupled to the tray mounting part 314, the tray mounting part 314 may surround the tray coupling part 301 to come into contact with an outer surface of the tray coupling part 301 and support the tray coupling part 301 so that the tray coupling part 301 does not move in up and down/left and right directions. However, the tray coupling part 301 may be movably inserted and withdrawn in the front and rear direction within the tray mounting part 314.

A projection 314b may be disposed inside the tray mounting part 314. Also, since a coupling groove 302 is defined in the tray coupling part 301, when the tray coupling part 301 is inserted into the tray mounting part 314, the projection 314b may be coupled to the coupling groove 302 to maintain the state in which the tray 300 is mounted on the rotatable ring 310. Also, when the tray 300 is mounted, the coupling between the projection 314b and the coupling groove 302 may be easily recognized. Since the tray coupling part 301 is inserted into and coupled to the tray mounting part 314, the tray 300 may be coupled to the rotatable ring 310 to rotate in the left and right direction with respect to the base 113.

A separation prevention projection 113f is disposed on the second rotation guide part 113e to prevent the rotatable ring 310 from being separated from the second rotation guide part 113e. An upper end of the separation prevention projection 113f may have a hook shape that is hooked with a top surface of the inner ring part 312. Thus, when the tray 300 rotates, the rotatable ring 310 may be lifted upward to prevent the rotatable ring 310 from being separated from the second rotation guide part 113e and stably maintain the rotation of the tray 300.

A pressure sensitive valve 116 may be provided at a center of the front portion of the base 113. The pressure sensitive valve 116 may adjust a pressure of water supplied from a water supply system to smoothly perform water purifying and adjust a water pressure when the water is dispensed. The pressure sensitive valve 116 may be disposed in an internal region of the inner ring part 312 when the rotatable ring 310 is mounted to improve space efficiency.

A mounting part 113g on which the compressor 141 is mounted is disposed on a central portion of the base 113. The mounting part 113g may protrude upward to support the compressor 141. Also, four mounting parts 113g may be provided to support four corners of the bottom surface of the compressor 141. Also, a nut is insert-injection-molded to the mounting part 113g. Thus, after the compressor 141 is seated, the screw may be coupled from a lower side to fix the compressor 141.

A suction grill 113h is further disposed at the central portion of the base 113. At least a portion of the suction grill 113h may be disposed between the mounting parts 113g and also disposed below the compressor 141. Thus, air suctioned into the water purifier 10 may pass through the compressor 141 to cool the compressor 141. The suction grill 113h may have a lattice shape. Also, a plurality of suction holes may be defined in the suction grill 113h to prevent foreign substances from being introduced from the outside.

A condenser bracket 144 in which the condenser 142 is accommodated is disposed at a rear side of the suction grill 113h. The condenser bracket 144 is disposed on the rear portion of the base 113. The condenser bracket 144 may include a condenser mounting part 145 fixed to the base 113 and a tank mounting part 146 disposed above the condenser mounting part 145.

A cooling fan 143 is disposed on a front surface of the condenser mounting part 145. External air may be suctioned through the suction grill 113h by the cooling fan 143 to cool the compressor 141 and the condenser 142 and then be discharged to a discharge hole 112a. Also, a rear surface of the condenser mounting part 145 comes into contact with the discharge hole 112a. The condenser 142 accommodated in the condenser mounting part 145 is disposed adjacent to the discharge hole 112a of the water purifier 10.

A cord mounting part 113i to which a power cord 117 is fixed is disposed on a rear end of the base 103. Also, a cord guide part 113j is disposed from the cord mounting part 113i to a central portion of the base 113. Thus, the power cord 117 may be movable along the cord guide part 113j and connected to the control assembly 170.

Also, a water inflow tube entrance 113k into which a water inflow tube 191 is introduced is provided in the rear end of the base 113, and the water inflow tube 191 connected to the water supply system is introduced through the water inflow tube entrance 113k. An end of the water inflow tube 191 may extend up to the pressure sensitive valve 116. Also, a tube guide 118 for preventing the water inflow tube 191 from being folded may be further provided at a portion of a bent section of the water inflow tube 191. The tube guide 118 may be made of a plastic material and guide the water inflow tube 191 to prevent the water inflow tube 191 from being excessively bent or folded. The tube guide 118 may be further disposed on the tubes through which the purified water, the cold water, and the hot water flow.

Figure 16:
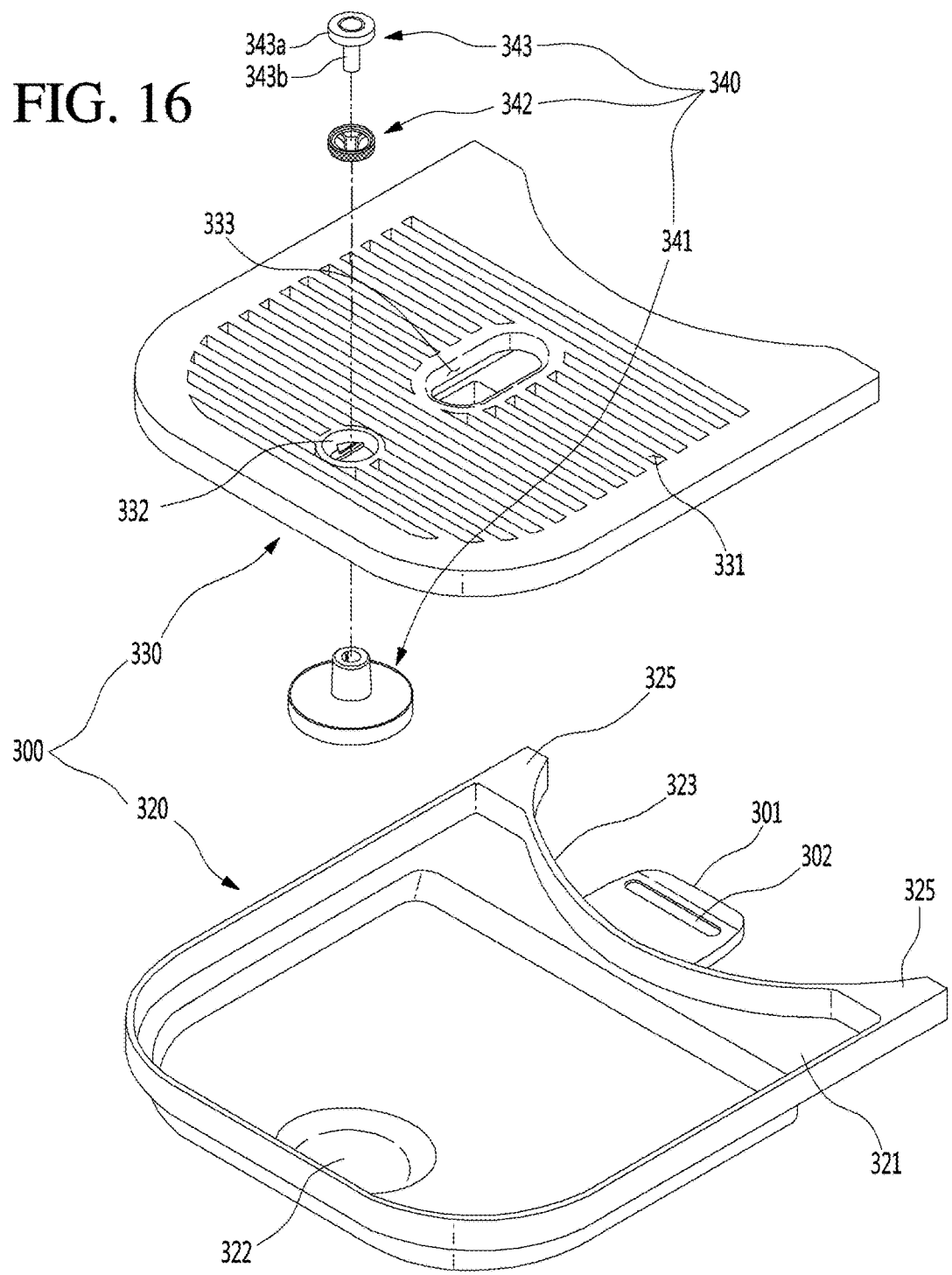
FIG. 16 is an exploded perspective view illustrating a coupling structure of the tray of the water purifier.
Figure 17:
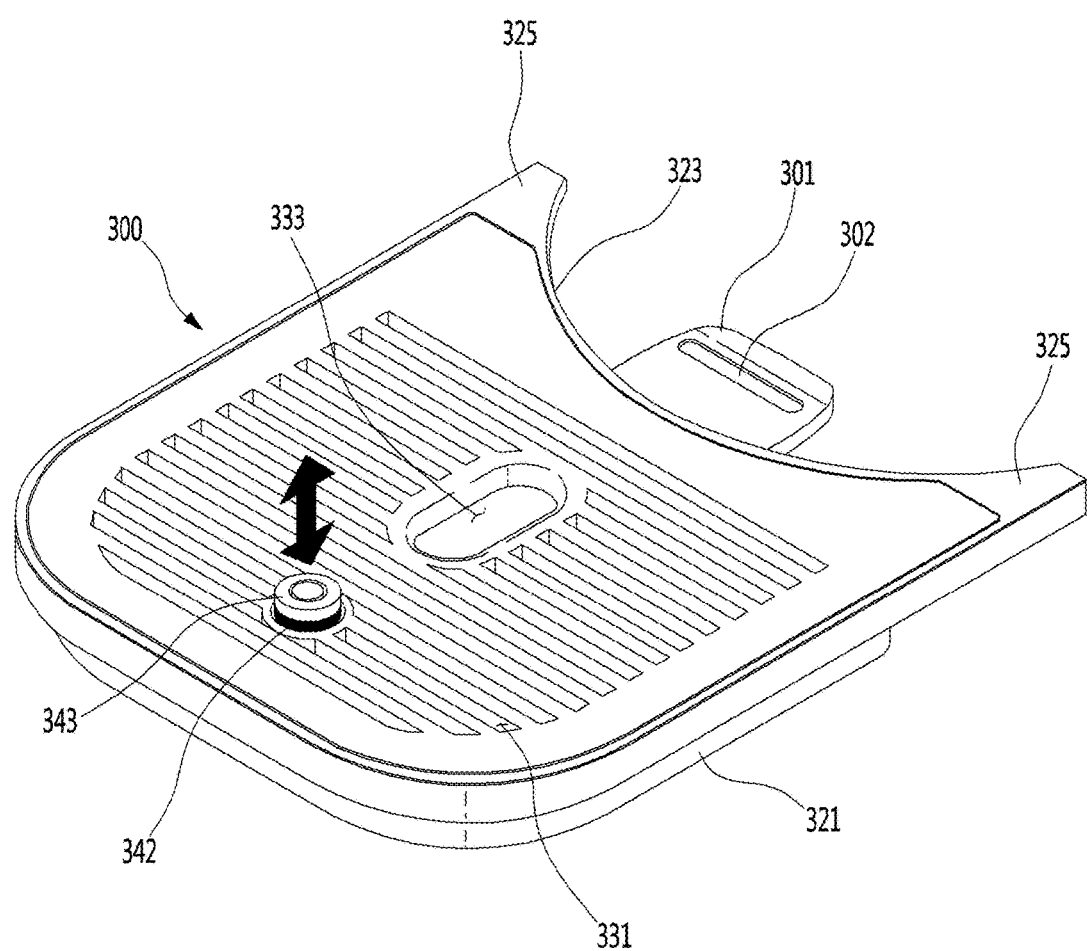
FIG. 17 is a view illustrating a full level state of the tray.

Referring to FIGS. 16 and 17, the tray 300 may include a tray body having a storage space therein and a tray cover 330 detachably coupled to cover an upper portion of the tray body 320.

The storage space may be recessed downward in the tray body 320 to store remnant water therein. An edge of the tray body 320 may surround a side surface of a border of the tray cover 330. A support part 321 supporting a bottom surface of the tray cover 330 may be disposed in the tray body 320.

A recess part 322 is defined in a bottom surface of the tray body 320. The recess part 322 may protrude downward from the bottom surface of the tray body 320 to come into contact with the ground on which the water purifier 10 is installed and thereby to support the bottom surface of the tray 300. Thus, the water purifier 10 may be supported at a predetermined height without dropping from the ground on which the water purifier 10 is installed when the tray 300 rotates in the left and right direction.

The recess part 322 may have a size equal to or greater than that of a floater 340 so that the floater 340 is accommodated. Thus, the floater 340 may be disposed inside the recess part 322 so as to be elevated according to a water level.

The floater 340 may include a floating part 341, an indicator 342, and a cap 343. The floating part 341 may have a size that is capable of being accommodated in the recess part 322 and be made of material that is floatable in water by buoyancy.

Also, the indicator 342 may be disposed on an upper end of the floating part 341 and mounted to be fixed to the floating part 341 by the cap 343. The indicator 342 may have a ring shape and also have a color different from each of the floating part 341, the cap 343, and the tray cover 330.

Also, the cap 343 may be dispose don an upper end of the floater 340 to provide a portion exposed to the tray cover 330. The cap 343 includes an exposure part 343a exposed to the tray cover 330 and a through-part 343b extending downward from the exposure part 343a. The exposure part 343a may have the same diameter and shape as the indicator 342. Also, the through-part 343b may pass through the indicator 342 and then be inserted into the upper end of the floating part 341.

In a state in which a predetermined amount of water is not filled into the tray 300, a top surface of the cap 343 may be disposed on the same plane as the top surface of the tray cover 330 or disposed below the top surface of the tray cover 330. Also, when a predetermined amount or more of water is filled into the tray 300, or water is fully filled into the tray 300, the floating part 341 may be floated by the buoyancy, and thus, the cap 343 may also further protrude from the top surface of the tray cover 330.

Here, as illustrated in FIG. 14, when the floating part 341 is completely floated, the indicator 342 may protrude upward from the top surface of the tray cover 330. Thus, the user may recognize the full level when the color of the indicator 342 is identified, and thus, the tray 300 may be separated to empty the stored water.

Also, a concave part 323 that is recessed in an arc shape may be defined in a rear surface of the tray body 320 and a rear end of the tray cover 330. The concave part 323 may surround a portion of the rotatable ring 310, and the rear end of the tray 300 may be closely attached to the rotatable ring 310.

Also, a protrusion 325 protrudes backward from each of both sides of the rear end of the tray body 320. The protrusion 325 may have an outer surface that extends with the same plane as one side surface of the tray body 320 to cover a connection portion between the tray 300 and the rotatable ring 310.

Particularly, when the tray 300 rotates, an outer appearance may extend from an outer appearance of the front surface of the water purifier, which is rounded. Thus, the outer appearance may be maintained in the elegant state regardless of the rotation of the tray 300.

Also, the tray coupling part 301 protrudes backward from a center of the concave part 323 of the tray body 320 to couple the tray 300 to the rotatable ring 310. The tray coupling part 301 may be inserted into and coupled to the tray mounting part 314 when the tray 300 is mounted.

A plurality of slits 331 may be provided in the tray cover 330. Thus, the remnant water may be introduced into the storage space of the tray body 320 through the slits 331 and prevented from being splashed out of the tray body 320.

An indicating hole 332 may be further defined in the tray cover 330. The indicating hole 332 may be defined at a position corresponding to that of the cap 343 of the floater 340 and have the same size as the cap 343. Thus, when the floater 340 is elevated, the cap 343 may vertically move through the indicating hole 332. Also, when the tray 300 is fully filled with water, the indicator 342 may be exposed to the outside of the indicating hole 332 to indicate a full level state of the water to the user.

A water collection hole 333 may be further defined in the tray cover 330. The water collection hole 333 may be opened just below the water discharge nozzle 280. Thus, when water is dispensed in a state in which a container such as a cup is not disposed on the tray 300, the dropping water may pass through the water collection hole 333 and then be directly collected in the tray 300.

Hereinafter, a process for dispensing water in the water purifier having the above-described structure according to another embodiment will be described.

Figure 18:
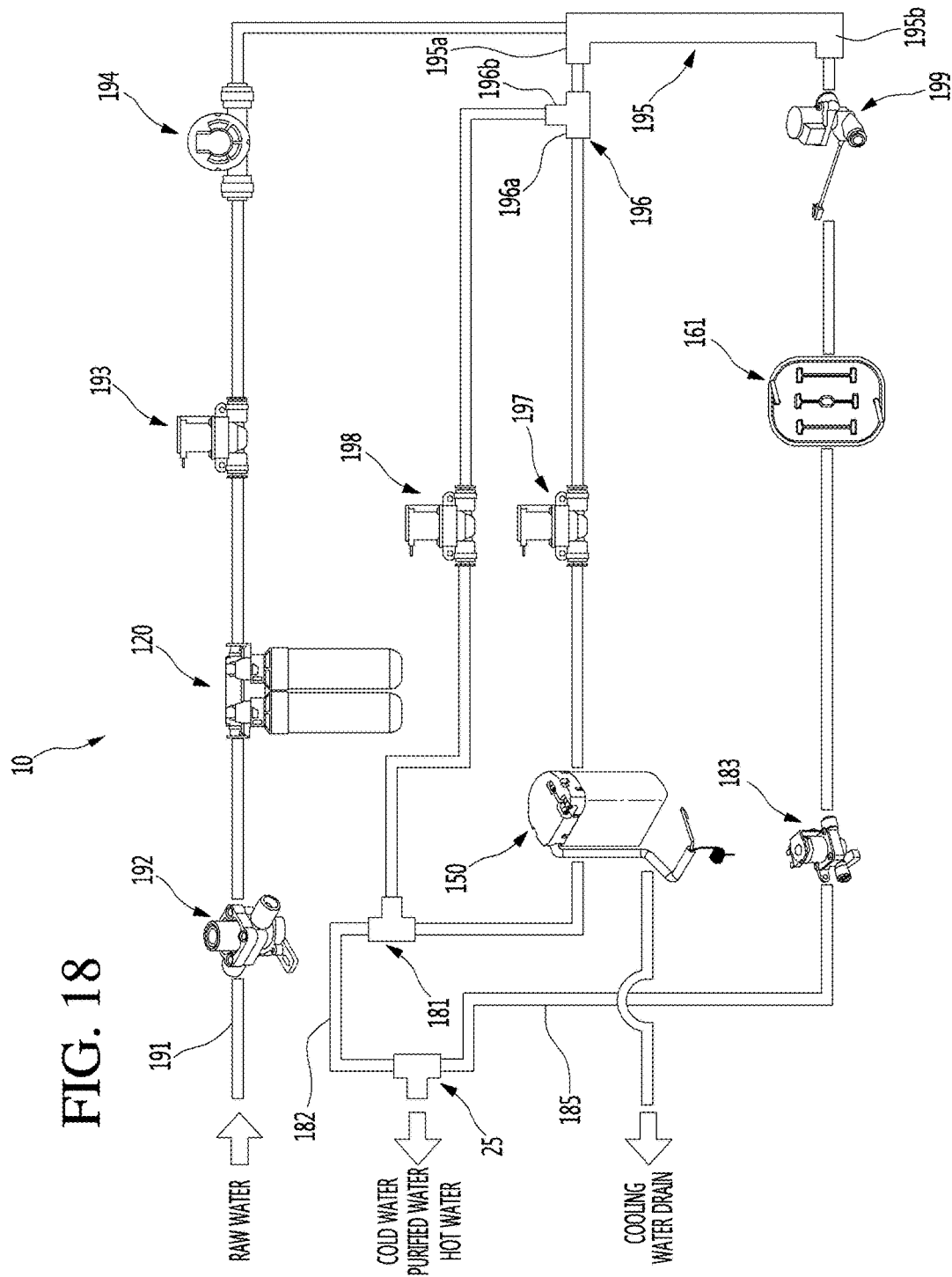
FIG. 18 is a schematic circuit diagram illustrating a flow path of water in the water purifier.

FIG. 18 is a schematic circuit diagram illustrating a flow path of water in the water purifier. Also, FIG. 19 is a block diagram illustrating a flow of a control signal in the water purifier.

Referring to FIGS. 18 and 19, the water inflow tube 181 of the water purifier 10 is connected to the water supply system to receive raw water. The water inflow tube 191 is connected to the pressure sensitive valve 192, and the raw water passing through the pressure sensitive valve 192 is decompressed to a preset pressure for the operation of the water purifier 10.

Also, the decompressed raw water flows to the filter 120 along the tube connecting the pressure sensitive valve 192 to the filter 120. Foreign substances contained in the raw water may be removed while passing through the filter 120, and then, the water may be purified. Also, a feed valve 193 may be opened to allow the purified water to sequentially pass through the feed valve 193 and a flow sensor 194 along the tube.

Here, the feed valve 193 and the flow sensor 194 may be connected to a main PCB 510. A degree of opening of the feed valve 193 may be adjusted according to a signal transmitted to the main PCB 510. Also, information with respect to a flow rate detected by the flow sensor 194 may be transmitted to the main PCB 510 and used as data for controlling the water purifier.

The purified water passing through the flow sensor 194 may be branched into a cold and purified water side 195a and a hot water side 195b through a branch tube 195.

First, the purified water flowing to the tube of the cold and purified water side 195a may be branched again into a cold water side 196a and a purified water side 196b by a T connector 196 and then respectively connected to a cold water discharge valve 197 and a purified water discharge valve 198. The purified water discharge valve and the cold water discharge valve 197 may be connected to the main PCB 510 and thus be opened and closed by the control of the main PCB 510. That is, the purified water discharge valve 198 and the cold water discharge valve 197 may be selected by user's setting. The water discharge button 420 may be manipulated to open the selected valve and dispense water.

The water passing through the cold water discharge valve 197 may pass through a cooling coil within the cooling tank 150. The water flowing along the cooling coil is heat-exchanged with cooling water within the cooling tank 150. For this, the cooling water may be cooled to be maintained at a preset temperature.

To cool the cooling water, the compressor 141 connected to the main PCB 510 is driven. The driving of the compressor 141 may be determined by a cold water temperature sensor 152 provided in the cooling tank 150. Thus, the cooling water may be always maintained at the preset temperature. For this, the driving of the compressor 141 may be controlled. The compressor 141 may be adjusted in frequency to correspond to a load that is required for an inverter compressor and thus adjusted in cooling capacity. That is, the compressor 141 may be driven by the invert control to cool the cooling water with optimal efficiency.

An operation of the compressor 141 may be set in a forcibly turned-off state by manipulating the manipulation part or manipulation portion 410 by the user. The compressor 141 may be forcibly maintained in the turn-off state when cold water consumption is low at winter, power saving is required, or the cold water is not desired to be used.

Also, the main PCB 510 may control the driving of the compressor 141 and driving of the cooling fan 143. Also, the main PCB 510 may control driving of an agitator motor 153 provided in the cooling tank 150. The motor 153 may be driven to improve the heat-exchange efficiency between the cold water and the cold water passing through the cooling coil and controlled by the main PCB 510. An agitator rotates by the driving of the motor 153, and the cold water may be forcibly convected within the cooling tank 150. As a result, the purified water within the cooling coil may be effectively cooled.

The cold water passing through the cooling tank 150 may be introduced into the water discharge tube 182 through the T-connector, and the cold water passing through the water discharge tube 182 may be dispensed to the outside through the water discharge nozzle 280.

When the purified water discharge valve 198 is opened, the purified water passing through the purified water discharge valve 198 may be introduced into the water discharge tube 182 through the T-connector 181 and then pass through the water discharge tube 182 and be dispensed to the outside through the water discharge nozzle 280.

When the user selects dispensing of the hot water, the purified water may flow to the hot water side 195b of the branch tube 195. A flow rate adjustment valve 199 is opened by the control of the main PCB 510, and water flowing through the flow rate adjustment valve 199 is adjusted to an adequate flow rate for heating of the hot water. That is, an amount of purified water supplied to the hot water tank 161 may be adjusted so that the water is heated at the preset temperature by the induction heating assembly 160.

The purified water passing through the flow rate adjustment valve 199 passes through the hot water tank 161. Also, while passing through the hot water tank 161, the water may be heated at the preset temperature. The hot water tank 161 may be heated in the induction heating manner. For this, an output of magnetic force of a working coil may be adjusted by the control of an induction heating PCB 520.

To drive the induction heating assembly 160, a high voltage is required for the main PCB 510. To supply the high voltage, power may be supplied from a power supply PCB 530 connected to a power line. The power supply PCB 530 may supply adequate power according to whether the induction heating assembly 160 is driven and also supply adequate power to the main PCB 510.

The water within the hot water tank 161 may be heated at the preset temperature by driving the induction heating assembly 160. A hot water temperature sensor may be provided in the hot water discharge valve 183. The hot water temperature sensor may detect a temperature of hot water discharged via the hot water tank 161 to transmit the detected temperature data to the main PCB 510. Also, the output of the working coil may be adjusted based on the hot water temperature data inputted into the main PCB 510.

Also, a tank temperature sensor 162 provided outside the hot water tank 161 may detect a temperature of the hot water tank 161 itself. When the temperature detected by the tank temperature sensor 162 is above the preset temperature to cause possibility of firing, a signal may be transmitted to the main PBC 510 to break a fuse 184. An over load protection (OLP) 147 may be connected to the main PCB 510. The OLP 147 may cut off the power supply when the overload occurs in the compressor 141 to protect the compressor 141.

When the fuse 184 is broken due to an abnormal operation of the induction heating assembly 160, power supplied from the power supply PCB 530 to the induction heating PCB 520 may be cut off to prevent the induction heating assembly 160 from being overheated or damaged.

The hot water heated by passing through the hot water tank 161 by the hot water discharge valve 183 may flow to the water discharge nozzle 280 through the hot water tube 185 and then dispensed to the outside.

When water is dispensed by the manipulation of the water discharge button 420, an LED of the manipulation part 410 may be turned on by the control of a manipulation part PCB 411.

A hot water button, a purified water button, and a cold water button may be provided on the manipulation part 410. Here, in case of the hot water button, a temperature of the hot water may be set. Also, an amount selection button for setting an amount of water to be dispensed and a continuous button for selecting continuous dispensing may be provided. Also, a locking button for temporarily blocking the manipulation of the manipulation part 410 may be provided.

In the manipulation part PCB 411, a state or a change cycle of the filter 120 may be recognized through a color of a switch LED 412 that is turned on, which is displayed through the water discharge button 420 regardless of the manipulation of the water discharge button.

Also, information with respect to an operation state or operation degree of the water purifier 10 may be transmitted to a terminal such as a user's mobile phone through an NFC (near-field communication) PCB 430 and then displayed. Also, information and operation signal may be transmitted to the NFC PCB 430 through the terminal, and the water purifier 10 may be driven by using the transmitted information.

For example, the user may confirm information such as a lifespan of the filter 120 and a use pattern of the water purifier 10 through an application installed in the terminal. Also, an operation of the water purifier 10 such as setting of a saving mode in which a cold water mode of the water purifier 10 is turned off may be set through the application.

While the water purifier 10 is used, the cooling water within the cooling tank 150 may be drained, and then, new cooling water may be filled into the cooling tank 150.

Embodiments provide a water purifier that is capable of freely adjusting a height of a water discharge nozzle.

Embodiments also provide a water purifier in which water dispensed from a water discharge nozzle is prevented from being splashed out of a cup by a head of water dispensed from a water discharge nozzle.

Embodiments also provide a water purifier in which a water discharge nozzle does not randomly drop down by a self-weight of a movable case in a state in which the movable case, on which a water discharge nozzle is mounted, is completely accommodated in a fixed case, but be maintained in the state of being accommodated in the fixed case.

Embodiments also provide a water purifier in which a movable case, on which a water discharge nozzle is mounted, is fixed at a desired position even though a user's hand leaves from the movable case in a state in which the user holds the movable case to allow the movable case to descend to the desired position.

Embodiments also provide a water purifier in which a movable case on which a water discharge nozzle is mounted is straightly elevated.

Embodiments also provide a water purifier in which a movable case on which a water discharge nozzle is mounted is smoothly elevated.

Embodiments also provide a water purifier in which a movable case on which a water discharge nozzle is mounted is accurately elevated up to a height that is desired by a user.

Embodiments also provide a water purifier in which operational sensitivity felt by a user is improved while a movable case on which a water discharge nozzle is mounted is elevated.

Embodiments also provide a water purifier in which deformation of a fixed case and a movable case such as warpage is prevented, and mutual coupling force is secured.

Embodiments also provide a water purifier in which a movable case is elevated without being shaken in front and rear directions or left and right directions.

Embodiments also provide a water purifier in which a movable case and a fixed case are easily coupled to each other.

Embodiments also provide a water purifier in which a user holds a movable case to elevate the movable case without being slid.

Embodiments also provide a water purifier which is capable of reducing abrasion and noises generated due to friction between a movable case and a fixed case.

Embodiments also provide a water purifier in which a tray rotates to a desired position and is freely detachable to improve user's convenience.

Embodiments also provide a water purifier in which various parts are not exposed to the outside to realize an elegant outer appearance.

Embodiments also provide a water purifier which is hygienic and capable of preventing a water discharge nozzle from being damaged and deformed.

Embodiments also provide a water purifier which is capable of preventing safety accident because short children do not recognize a manipulation part and also do not easily manipulate the manipulation part even though the children recognize the manipulation part.

Embodiments also provide a water purifier in which all of adults and short children are capable of recognizing a water discharge button and easily manipulating the water discharge button to dispense water when discharge of the water is required.

In one embodiment, a water purifier includes: a water purifier body including a housing defining an outer appearance and a filter provided in the housing to filter raw water introduced from the outside; a water discharge module including a water discharge nozzle that protrudes forward from the water purifier body to supply the water passing through the filter to the outside of the water purifier body; and a tray disposed below the water discharge nozzle, wherein the water discharge module includes: a fixed case providing an elevation space in a vertical direction, having a lower side so that the elevation space communicates with the outside, and fixed to the water purifier body; a movable case to which the water discharge nozzle is fixed and which is accommodated in the elevation space of the fixed case so as to be elevated; and a resistance unit provided in the fixed case or the movable case to reduce elevation force, which is applied to the movable case to ascend or descend. Thus, in the state in which the movable case is completely accommodated in the fixed case, the movable case may be maintained in the accommodated state without randomly descending by the self-weight thereof. Also, in the state in which the user holds the movable case to allow the movable case to descend up to a desired position, although the user's hand leaves from the movable case, the movable case may be fixed to the position.

A guide part guiding the movable case to straightly elevate the movable case may be disposed in the fixed case or the movable case. The guide part may include: a guide groove defined in the fixed case in the elevation direction; and a guide piece disposed on the movable case and inserted into the guide groove. Thus, the guide piece may be inserted into the guide groove having a linear shape to straightly move along the guide groove. Thus, the movable case may be straightly elevated.

The guide piece may be rotatably mounted on the movable case. Thus, the guide piece may be straightly elevated along the guide groove in a state in which friction force between the guide piece and the guide groove is maximally reduced. Thus, the movable case may be smoothly elevated, and the user may feel improved operational sensitivity.

First gear teeth may be disposed inside the guide groove, and second gear teeth engaged with the first gear teeth may be disposed on an outer circumferential surface of the guide piece. Thus, while the guide piece rotates, the guide piece may be more accurately and straightly elevated along the guide groove, and thus, the elevation of the movable case may be more accurately and straightly elevated.

The resistance unit may include an oil damper. The resistance unit may include an oil damper, and the guide piece may be connected to a rotation shaft of the resistance unit. Thus, the movable case may be prevented from descending by a self-weight, and the user may feel the improved operational sensitivity when the user manipulates the elevation of the movable case.

The fixed case and the movable case may come into line contact with each other. At least one or more contact projections may be disposed on the fixed case or the movable case along the elevation direction of the movable case. Thus, the friction force between the fixed case and the movable case may be reduced, and the fixed case and the movable case may be contact-supported by each other to prevent the fixed case and the movable case from being deformed such as warpage and secure coupling force between the fixed case and the movable case.

The fixed case may include a wing part extending outward from each of both sides of a rear portion of the fixed case, the movable case may include an extension part extending in parallel to the wing part from each of both sides of the rear portion of the movable case and a bent part extending to be bent forward from the extension part and has an end on which a hook is disposed inward, and the wing part may be accommodated in a accommodation groove between the extension part and the hook. Thus, the bent part may be supported by the wing part to elevate the movable case without being shaken in the left and right direction.

A first contact projection may be disposed on a surface of the wing part facing the extension part in the elevation direction of the movable case. A second contact projection may be disposed on a surface of the hook facing the wing part in the elevation direction of the movable case. Thus, the fixed case and the movable case may doubly come into line contact with each other, and the movable case may be elevated so that the movable case is more stably elevated.

Inclined surfaces that are parallel to each other may be disposed on a front surface of the hook and a rear surface of the wing part, respectively. Thus, the movable case may be easily inserted forward from a rear side of the fixed case.

A handle part protruding outward may be disposed on a lower end of each of both sides of the movable case, and a seating groove in which the handle part is seated may be defined in a lower end of each of both sides of the fixed case. Thus, when the movable case ascends, the handle part may be hung on the seating groove, and the seating groove may serve as a stopper for restricting an ascending height of the movable case.

A grasping groove that is recessed inward may be defined in the handle part. Thus, the user may allow the movable case to descend or ascend without the movable case is slid.

At least one of the fixed case and the movable case may be made of an engineering plastic material having lubricity. Thus, when the movable case is elevated within the fixed case, abrasion and noises due to the friction between the fixed case and the movable case may be reduced, and the operational sensitive may be improved.

The water purifier may further include a base defining a bottom surface of the housing of the water purifier, wherein the tray may be rotatably mounted on the base. The water purifier may further include a rotatable ring rotatably mounted on the base, wherein the tray may be detachably mounted on the rotatable ring and extend to the outside of the housing. Thus, the tray may rotate to a desired position and freely detached to provide user's convenience.

The water discharge module may further include a front case covering a front surface of the fixed case. Thus, the components such as the resistance unit and the guide part may not be exposed to realize an elegant outer appearance.

The water discharge nozzle may be made of a stainless steel material. Thus, the water discharge nozzle may not be rust to prevent damage and deformation from being occurring due to the frequent use. Also, the elegant outer appearance may be further improved.

The water discharge nozzle may be integrated with the movable case or a connection member connecting the movable case to the water discharge nozzle through an insert injection manner. Thus, the coupling force between the water discharge nozzle and the movable or connection member, furthermore, a supply hose may increase to prevent water from leaking. Also, manufacture may be facilitated when compared to the existing assembly method.

A manipulation part may be disposed on a top surface of the water discharge module. Thus, in case of short children, the children may not recognize the manipulation part and also may not easily manipulate the manipulation part even though the children recognize the manipulation part to prevent safety accidents from occurring.

A water discharge button may be disposed on a front surface of the water discharge module. Adults and short children may recognize the water discharge button and easily manipulate the water discharge button when discharge of water is required to dispense the water.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure relates. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
    a housing;
    a filter provided in the housing to filter water;
    a tray extending from the housing;
    a water discharge module including:
        a water discharge nozzle provided to dispense water, the water discharge nozzle connected to the filter via a supply line so as to receive water through the filter;
        a fixed case extending from the housing, the fixed case fixed to the housing at a predetermined distance above the tray to provide a space between the fixed case and the tray, the fixed case including an opening in a lower portion thereof;
        a movable case to which the water discharge nozzle is attached and which is provided in the opening of the fixed case, the movable case adjustably attached to the fixed case to enable vertical adjustment of the movable case within the space; and
        a damper provided in one of the fixed case and the movable case, the damper configured to mechanically resist the vertical adjustment within the space and to allow the vertical adjustment under an externally applied force so as to allow the movable case to selectively ascend or descend within the space, wherein the movable case includes a handle portion, which protrudes outward, provided on a lower end of each of both sides of the movable case, the fixed case includes a seating groove defined in a lower end of each of both sides of the fixed case, and the handle portion is seated in the seating groove.

2. The liquid dispenser according to claim 1, further including a guide assembly that guides the movable case in a straight manner during the vertical adjustment of the movable case within the space, the guide assembly provided on a least one of the fixed case and the movable case.

3. The liquid dispenser according to claim 2, wherein the guide assembly includes:
    a guide groove defined in the fixed case in a direction of the vertical adjustment; and
    a guide piece provided on the movable case and inserted into the guide groove.

4. The liquid dispenser according to claim 3, wherein the guide piece is rotatably mounted on the movable case.

5. The liquid dispenser according to claim 4, wherein first gear teeth are provided inside the guide groove, and second gear teeth are provided on an outer circumferential surface of the guide piece, the second gear teeth configured to engage with the first gear teeth.

6. The liquid dispenser according to claim 1, wherein the damper includes an oil damper.

7. The liquid dispenser according to claim 5, wherein the damper includes an oil damper, and the guide piece is connected to a rotation shaft of the damper.

8. The liquid dispenser according to claim 1, wherein the fixed case and the movable case are in physical contact with each other.

9. The liquid dispenser according to claim 8, wherein at least one contact projection is provided on a surface of at least one of the fixed case and the movable case, the surface extending along a direction of the vertical adjustment of the movable case.

10. The liquid dispenser according to claim 1, wherein the fixed case includes a wing part extending outward from each of both sides of a rear portion of the fixed case, the movable case includes (a) an extension part extending in parallel to the wing part from each of both sides of the rear portion of the movable case, (b) a bent part extending forward from the extension part, the bent part including an end, and (c) a hook provided on the end of the bent part, the hook extending inward, and the wing part is accommodated in an accommodation groove between the extension part and the hook.

11. The liquid dispenser according to claim 10, wherein a first contact projection is provided on a surface of the wing part facing the extension part, the surface extending along a direction of the vertical adjustment of the movable case.

12. The liquid dispenser according to claim 10, wherein a second contact projection is provided on a surface of the hook facing the wing part, the surface of the hook extending along a direction of the vertical adjustment of the movable case.

13. The liquid dispenser according to claim 10, wherein inclined surfaces that are parallel to each other are provided on a front surface of the hook and a rear surface of the wing part, respectively.

14. The liquid dispenser according to claim 1, wherein a grasping groove that is recessed inward is defined in the handle portion.

15. The liquid dispenser according to claim 1, wherein at least one of the fixed case and the movable case is made of an engineering plastic material having lubricity.

16. The liquid dispenser according to claim 1, further including a base defining a bottom surface of the housing of the liquid dispenser, wherein the tray is rotatably mounted on the base.

17. The liquid dispenser according to claim 16, further including a rotatable ring rotatably mounted on the base, wherein the tray is detachably mounted on the rotatable ring and extends from the housing.

18. The liquid dispenser according to claim 1, wherein the water discharge module further includes a front case covering a front surface of the fixed case.

19. The liquid dispenser according to claim 1, wherein the water discharge nozzle is made of a stainless steel material.

20. The liquid dispenser according to claim 19, wherein (a) the water discharge nozzle is integrated with the movable case, or (b) a connection member connects the movable case to the water discharge nozzle.

21. The liquid dispenser according to claim 1, wherein a manipulation assembly is provided on a top surface of the water discharge module.

22. The liquid dispenser according to claim 1, wherein a water discharge button is provided on a front surface of the water discharge module.

* * * * *